US012171162B2

(12) United States Patent
Baum et al.

(10) Patent No.: US 12,171,162 B2
(45) Date of Patent: Dec. 24, 2024

(54) HARVESTING MACHINE HAVING A FLAIL CUTTER AND A MOISTURE REMOVAL MECHANISM

(71) Applicant: Baum Machine, Inc., Appleton, WI (US)

(72) Inventors: Rodger J Baum, Appleton, WI (US); Charles J Baum, Appleton, WI (US)

(73) Assignee: Baum Machine, Inc., Appleton, WI (US)

( * ) Notice: Subject to any disclaimer, the term of this patent is extended or adjusted under 35 U.S.C. 154(b) by 715 days.

(21) Appl. No.: 17/460,521

(22) Filed: Aug. 30, 2021

(65) Prior Publication Data

US 2021/0386015 A1    Dec. 16, 2021

Related U.S. Application Data

(63) Continuation-in-part of application No. 16/884,134, filed on May 27, 2020, now abandoned, which is a
(Continued)

(51) Int. Cl.
*A01D 41/06* (2006.01)
*A01D 34/03* (2006.01)
(Continued)

(52) U.S. Cl.
CPC .......... *A01D 41/06* (2013.01); *A01D 41/133* (2013.01); *A01D 43/003* (2013.01);
(Continued)

(58) Field of Classification Search
CPC .... A01D 43/003; A01D 43/006; A01D 82/02; A01D 41/133
See application file for complete search history.

(56) References Cited

U.S. PATENT DOCUMENTS 2,756,554 A    7/1956    Diehl et al.
2,772,606 A    12/1956    Kelly
(Continued)

FOREIGN PATENT DOCUMENTS

DE    3912437 A1    10/1990
EP    0507390    10/1992
(Continued)

OTHER PUBLICATIONS

Glenn E. Hall, Flail Conditioning of Alfalfa Hay, Research Circular, May 1962, vol. 107, Ohio Agricultural Experiment Station, Wooster, OH.
(Continued)

*Primary Examiner* — Adam J Behrens
*Assistant Examiner* — Madeline I Runco
(74) *Attorney, Agent, or Firm* — Amundsen Davis, LLC

(57) ABSTRACT

A harvesting machine is disclosed along with a method of operation. The harvesting machine includes a frame having a flail cutter mounted on a first end of the frame. The flail cutter can cut the stems of growing plants. A housing surrounding a portion of the flail cutter for directing the cut plants rearward. An idler roller is positioned rearward of the flail cutter. First and second moisture removal mechanisms are positioned downstream of the cutting mechanism, and each includes a suction roll and a press roll. A moving belt forms a closed loop around the idler roller and the pair of suction and press rolls, and has a plurality of apertures formed therethrough. The moving belt forms first and second nips between each pair of suction and press rolls for squeezing moisture out of the cut stems as the stems are routed therebetween.

24 Claims, 17 Drawing Sheets

Related U.S. Application Data continuation of application No. 15/953,675, filed on Apr. 16, 2018, now Pat. No. 10,694,666.

(51) Int. Cl.

| | | |
|---|---|---|
| *A01D 34/04* | (2006.01) | |
| *A01D 34/14* | (2006.01) | |
| *A01D 41/133* | (2006.01) | |
| *A01D 43/00* | (2006.01) | |
| *A01D 43/073* | (2006.01) | |
| *A01D 43/077* | (2006.01) | |
| *A01D 43/08* | (2006.01) | |
| *A01D 43/10* | (2006.01) | |
| *A01D 82/02* | (2006.01) | |
| *A01D 91/04* | (2006.01) | |

(52) U.S. Cl.
CPC ......... *A01D 43/006* (2013.01); *A01D 43/073* (2013.01); *A01D 43/077* (2013.01); *A01D 43/087* (2013.01); *A01D 43/10* (2013.01); *A01D 82/02* (2013.01); *A01D 91/04* (2013.01); *A01D 34/032* (2013.01); *A01D 34/04* (2013.01); *A01D 34/14* (2013.01)

(56) References Cited

U.S. PATENT DOCUMENTS

| | | | |
|---|---|---|---|
| 2,909,881 | A | 10/1959 | Callahan |
| 3,162,568 | A | 12/1964 | Post |
| 3,233,393 | A * | 2/1966 | Lundell ............... A01D 43/006 425/DIG. 230 |
| 3,311,238 | A | 3/1967 | Huff |
| 3,527,031 | A | 9/1970 | Winger |
| 4,207,811 | A | 6/1980 | Kline |
| 4,241,568 | A | 12/1980 | Mathews |
| 4,287,708 | A | 9/1981 | Neely, Jr. |
| 4,332,125 | A * | 6/1982 | Holdren ............... A01D 43/00 100/118 |
| 4,446,678 | A | 5/1984 | Smith |
| 4,631,910 | A | 12/1986 | Doyen et al. |
| 4,912,914 | A | 4/1990 | Wingard |
| 5,063,646 | A | 11/1991 | Zeiffer et al. |
| 5,105,563 | A | 4/1992 | Fingerson et al. |
| 5,326,320 | A | 7/1994 | Allwoerden |
| 5,485,718 | A | 1/1996 | Dallman |
| 5,546,736 | A * | 8/1996 | Allworden ............. A01D 82/00 56/16.4 B |
| 5,557,859 | A * | 9/1996 | Baron ................ F26B 21/083 34/512 |
| 5,666,794 | A | 9/1997 | Vought et al. |
| 6,032,446 | A | 3/2000 | Gola et al. |
| 6,592,721 | B1 | 7/2003 | Anderson et al. |
| 6,711,996 | B1 | 3/2004 | Mackie |
| 8,038,518 | B2 | 10/2011 | Marvin et al. |
| 8,333,059 | B2 | 12/2012 | McClure et al. |
| 9,155,250 | B2 | 10/2015 | Posselius et al. |
| 9,258,946 | B2 | 2/2016 | Olander et al. |
| 9,856,603 | B2 | 1/2018 | Anzel et al. |
| 2009/0205307 | A1 | 8/2009 | Warren, III et al. |
| 2012/0186214 | A1 | 7/2012 | Michel |
| 2014/0230395 | A1 | 8/2014 | Li et al. |
| 2017/0096775 | A1 | 4/2017 | Anzel et al. |
| 2018/0116122 | A1 | 5/2018 | Hill et al. |
| 2018/0306502 | A1 | 10/2018 | Gulbranson et al. |
| 2019/0257581 | A1 * | 8/2019 | Wray ................. F26B 1/005 |
| 2019/0313579 | A1 | 10/2019 | Baum et al. |

FOREIGN PATENT DOCUMENTS

| | | |
|---|---|---|
| GB | 1147069 | 4/1969 |
| GB | 1150050 | 4/1969 |

OTHER PUBLICATIONS

New Holland Self-Propelled Forage Harvesters, FX28, FX38, FX58, 16 pages, 2001.

New Holland Agriculture Competitive Comparison, FR Forage Cruiser, 28 pages, Document No. HFA-30282-13, Feb. 20, 2018 or earlier.

ZR5-1200 Self-Propelled Baler, 3 pages, Vermeer Corporation, 2019.

"Development and Evaluation of a Large-Scale Forage Mat Maker", Trans. Am. Soc. Agricultural Engineers, vol. 26 (Mar. 1993), pp. 285-291.

TissueStory, "Through Air Drying (TAD) tissue making technology", retrieved from the internet on Sep. 28, 2017 at www.tissuestory.com/2017/09/28/through-air-drying-tad-tissue-making-technology/, 6 pages.

* cited by examiner

HARVESTING MACHINE HAVING A FLAIL CUTTER AND A MOISTURE REMOVAL MECHANISM

CROSS-REFERENCE TO RELATED APPLICATIONS

This application claims priority as a continuation-in-part under 35 U.S.C. § 120 to pending non-provisional patent application Ser. No. 16/884,134, filed May 24, 2020, and entitled: "A HARVESTING MACHINE HAVING A MOISTURE REMOVAL MECHANISM", which is a continuation of application Ser. No. 15/953,675, filed Apr. 16, 2018, now issued as U.S. Pat. No. 10,694,666.

FIELD OF THE INVENTION

This invention relates to a harvesting machine having a flail cutter and a moisture removal mechanism. A method of operating the harvesting machine and a header, which can be attached to a self-propelled unit, are also disclosed.

BACKGROUND OF THE INVENTION

For centuries, farmers have cut forage crops for animals, such as alfalfa, hay, tall grass, etc., using hand tools. A hand sickle having a semi-circular blade is still used in many parts of the world. With advancement in mechanized machinery, harvesting machines have now replaced hand tools, especially in the more industrialized countries. A harvesting machine can be towed behind a tractor or it can be a self-propelled unit. Currently, a cut forage crop is deposited back onto the field in rows where it can be dried by the sun. The rows of crop, such as alfalfa, can be turned over once or twice during the drying process before the dried cut crop is picked up, chopped and blown into a storage wagon and/or taken to a silo for long term storage. The forage crop, especially alfalfa, is used as a feed crop for milking cows.

One major disadvantage with harvesting crops using a conventional haybine is that the weather must be dry for a few days or the farmer could lose a portion of his cut crop to mildew or mold while it is lying in the field. Farmers tend to listen to the weather forecast and if rain is imminent, they will not cut their crop until clear weather is forecast for a couple of days. This is especially true when harvesting alfalfa. If a farmer did cut his forage crop, and then it rained before his crop was fully dried by the sun, he would have to wait longer for his crop to dry. Worst case, the farmer could lose a portion of his crop to mildew and mold.

Now a harvesting machine has been invented which includes a flail cutter and a moisture removal mechanism which can remove a portion of the moisture present in the stems of the harvested crop. The moisture is removed by the harvesting machine immediately after the crop is cut and while the harvesting machine is still in the field. The harvesting machine also includes a crop converging mechanism, located behind the moisture removal mechanism, which gathers the low moisture content crop and directs it to a baler or a chopper. A baler will deposit either a round or a square bale onto the field, while a chopper will chop and blow the crop into a storage wagon for direct transport to a silo for long term storage.

A method of operating the harvesting machine and a header, which can be attached to a self-propelled unit, are also taught.

SUMMARY OF THE INVENTION

Briefly, this invention relates to a harvesting machine having a flail cutter and a moisture removal mechanism. This invention also relates to a method of operating the harvesting machine and to a header, which can be attached to the front of a self-propelled unit.

The harvesting machine includes a frame having a first end and a second end, and at least one axle having a pair of wheels. A flail cutter is mounted on the first end of the frame. The flail cutter has a rotatable shaft with a plurality of spaced apart cutting blades attached thereto. Each of the cutting blades contacts growing plants in a field, each plant having a stem containing a high moisture content and a stem base, and each of the cutting blades cutting the stems at the stem base as well as lengthwise. The harvesting machine also includes a housing surrounding at least a portion of the flail cutter for directing the cut plants rearward. The harvesting machine further includes an idler roller positioned rearward of the flail cutter. A first moisture removal mechanism is positioned downstream of the idler roller. The first moisture removal mechanism includes a first suction roll positioned below a first press roll. A second moisture removal mechanism is positioned downstream of the first moisture removal mechanism. The second moisture removal mechanism includes a second suction roll positioned below a second press roll. Lastly, the harvesting machine includes a moving belt forming a closed loop around the idler roller and both the first and second moisture removal mechanisms. The moving belt has a plurality of apertures formed therethrough. The moving belt forms a first nip with the first press roll and a second nip with the second press roll for squeezing moisture out of the cut plants, especially the stems, as the movable web is routed through the first and second nips.

A second embodiment of the harvesting machine includes a frame having a first end and a second end, and at least one axle having a pair of wheels. A flail cutter is mounted on the first end of the frame. The flail cutter has a rotatable shaft with a plurality of spaced apart cutting blades attached thereto. Each of the cutting blades contacts growing plants in a field, each plant having a stem containing a high moisture content and a stem base, and each of the cutting blades cutting the stems at the stem base as well as lengthwise. The harvesting machine also includes a housing which surrounds at least 40% of the flail cutter. The housing also directs the cut plants rearward. The harvesting machine further includes an idler roller positioned rearward of the flail cutter. A first moisture removal mechanism is positioned downstream of the idler roller. The first moisture removal mechanism includes a first suction roll positioned below a first press roll. A second moisture removal mechanism is positioned downstream of the first moisture removal mechanism. The second moisture removal mechanism includes a second suction roll positioned below a second press roll. Lastly, the harvesting machine includes a moving belt forming a closed loop around the idler roller and both the first and second moisture removal mechanisms. The moving belt has a plurality of apertures formed therethrough. The moving belt forms a first nip with the first press roll and a second nip with the second press roll for squeezing moisture out of the cut plants, especially the stems, as the movable web is routed through the first and second nips. The movable web is then routed into a baler to form a bale.

A method of operating a harvesting machine is also disclosed. The harvesting machine includes a frame having a first end and a second end, at least one axle having a pair of wheels. A flail cutter is mounted on the first end of the frame. The flail cutter has a rotatable shaft with a plurality of spaced apart cutting blades attached thereto. Each of the cutting blades contacts growing plants in a field, each plant having a stem having a high moisture content and a stem base, and each of the cutting blades cutting the stems at the stem base as well as lengthwise. The harvesting machine also includes a housing surrounding at least a portion of the flail cutter for directing the cut plants rearward. The harvesting machine further includes an idler roller positioned rearward of the flail cutter. A first moisture removal mechanism is positioned downstream of the idler roller. The first moisture removal mechanism includes a first suction roll positioned below a first press roll. A second moisture removal mechanism is positioned downstream of the first moisture removal mechanism. The second moisture removal mechanism includes a second suction roll positioned below a second press roll. Lastly, the harvesting machine includes a moving belt forming a closed loop around the idler roller and both the first and second moisture removal mechanisms. The moving belt has a plurality of apertures formed therethrough. The moving belt forms a first nip with the first press roll and a second nip with the second press roll for squeezing moisture out of the cut plants, especially the stems, as the movable web is routed through the first and second nips. The method includes the steps of attaching the flail cutter to a self-propelled unit which can be driven across a field for the purpose of harvesting a crop. The flail cutter is rotated to cut each of the stems adjacent to its stem base and routing the cut plants into the harvesting machine as a movable web. The movable web is then directed between the first and second nips to reduce the moisture content of the movable web by forcing moisture out of each of the plants.

A header for attachment to a self-propelled unit or to a chopper type machine, which is either self-propelled or a pull-type unit, is also disclosed. The header includes a frame having a first end and a second end, and at least one axle having a pair of wheels. A flail cutter is mounted on the first end of the frame. The flail cutter has a rotatable shaft with a plurality of spaced apart cutting blades attached thereto. Each of the cutting blades contacts growing plants in a field, each plant having a stem having a high moisture content and a stem base, and each of the cutting blades cutting the stems. The harvesting machine also includes a housing surrounding at least a portion of the flail cutter for directing the cut plants rearward. The harvesting machine further includes an idler roller positioned rearward of the flail cutter. A first moisture removal mechanism is positioned downstream of the idler roller. The first moisture removal mechanism includes a first suction roll positioned below a first press roll. A second moisture removal mechanism is positioned downstream of the first moisture removal mechanism. The second moisture removal mechanism includes a second suction roll positioned below a second press roll. Lastly, the harvesting machine includes a moving belt forming a closed loop around the idler roller and both the first and second moisture removal mechanisms. The moving belt has a plurality of apertures formed therethrough. The moving belt forms a first nip with the first press roll and a second nip with the second press roll for squeezing moisture out of the cut plants, especially the stems, as the movable web is routed through the first and second nips.

The general object of this invention is to provide a harvesting machine having a flail cutter and a moisture removal mechanism. A more specific object of this invention is to provide a harvesting machine that has a crop converging mechanism.

Another object of this invention is to provide a method of operating the harvesting machine.

A further object of this invention is to provide a header for attachment to a self-propelled unit or to a chopper type machine.

Still another object of this invention is to provide a harvesting machine which can reduce the moisture content of a crop immediately after the crop is cut.

Still further, an object of this invention is to provide a harvesting machine which can cut a crop, reduce the moisture content of the cut crop, and then bale the cut crop.

Other objects and advantages of the present invention will become more apparent to those skilled in the art in view of the following description and the accompanying drawings.

BRIEF DESCRIPTION OF THE DRAWINGS

FIG. 22 is a side view of a cutter blade having an attachment hole for providing attachment to the flail cutter shaft.

DETAILED DESCRIPTION OF THE INVENTION

Figure 1:
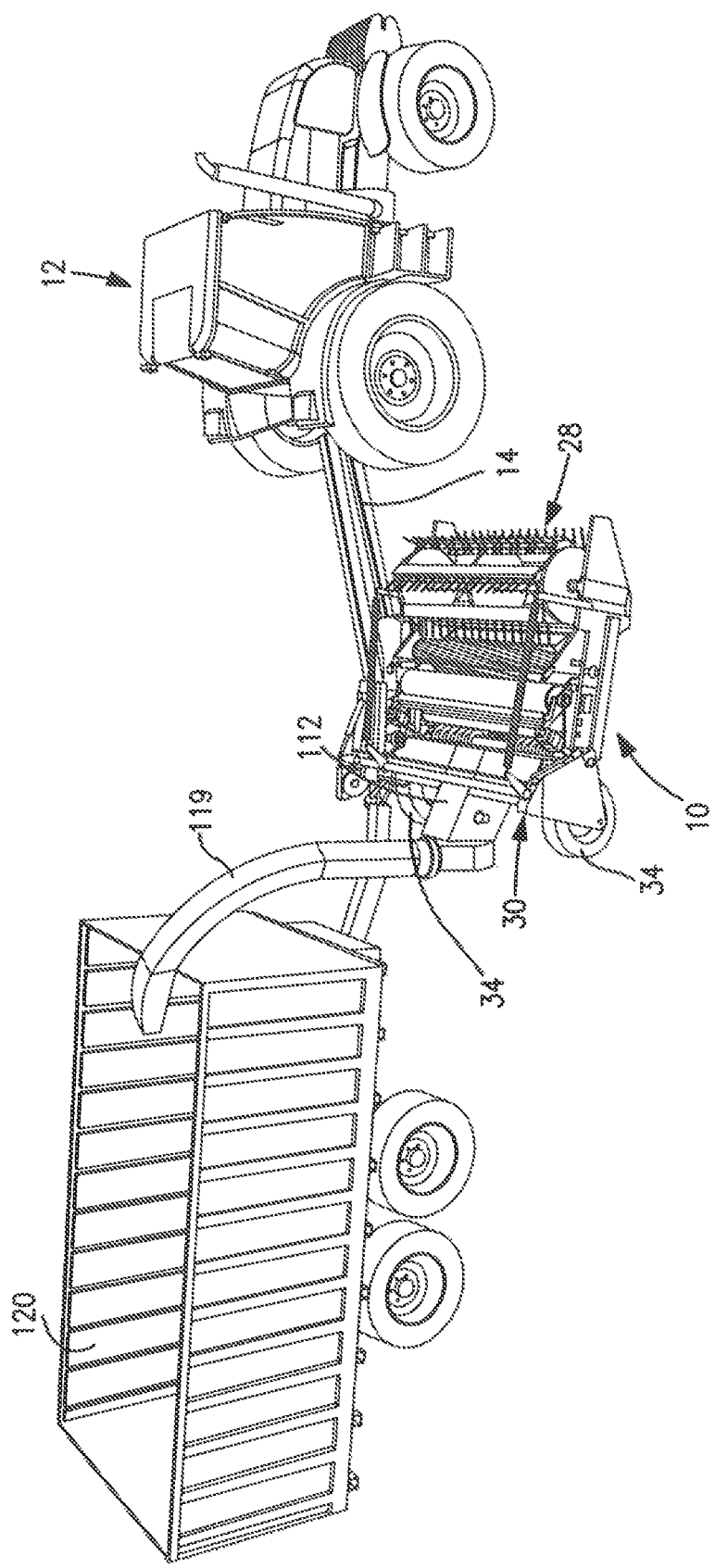
FIG. 1 is a schematic view of the harvesting machine being pulled behind a tractor.

Referring to FIG. 1, a harvesting machine 10 is shown being pulled behind a tractor 12. The size, design and horsepower of the tractor 12 can vary. The harvesting machine 10 is connected to the tractor 12 via a linkage bar 14. In addition, the harvesting machine 10 can be mechanically, hydraulically, pneumatically and/or electrically connected to the tractor 12, as is well known in the art. A power takeoff unit (not shown) on the rear of the tractor 12 can supply mechanical power to the harvesting machine 10. Hydraulic and pneumatic hoses (not shown) can be used to supply pressurized fluid and/or air to the harvesting machine 10. Lastly, electrical wires (not shown) can be used to supply electricity to the harvesting machine 10.

Figure 2:
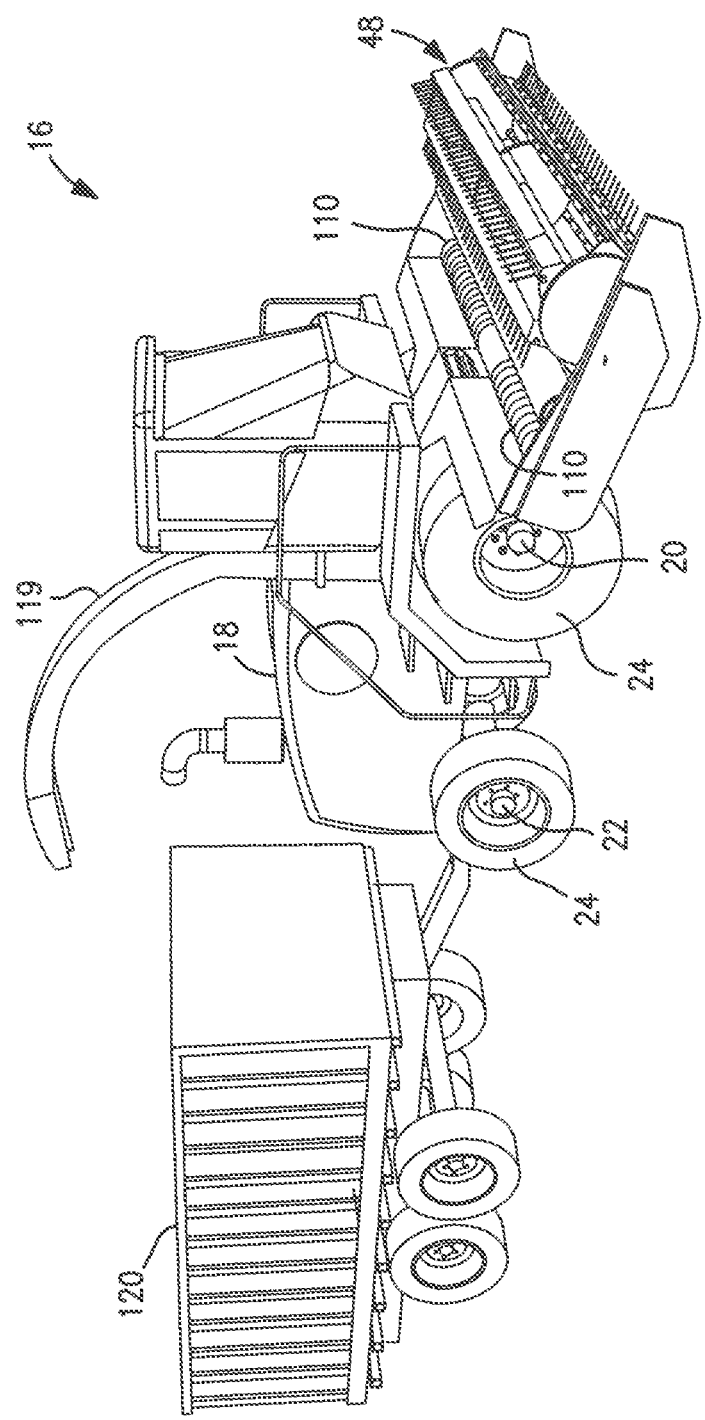
FIG. 2 is a schematic view of the harvesting machine as a self propelled unit.

Referring to FIG. 2, a self-propelled harvesting machine 16 is shown. By "self-propelled" it is meant containing its own means of propulsion. The self-propelled harvesting machine 16 will have its own power source 18, such as an engine, and normally will have two spaced apart axles 20 and 22. Each axle 20 and 22 supports a pair of wheels 24. The discussion below will focus on the harvesting machine 10 which is designed to be pulled by a tractor 12. However, the self-propelled unit 16 could be constructed having the same internal components as the harvesting machine 10.

Referring to FIGS. 1, and 3-5, the harvesting machine 10, which is designed to be pulled behind a tractor 12, has a frame 26 which has a first end 28 and a second end 30. The first end 28 corresponds to the front of the harvesting machine 10 and the second end 32 corresponds to the rear of the harvesting machine 10. The harvesting machine 10 has at least one axle 32, see FIG. 4, having a pair of wheels 34, 34 rotatably secured thereto.

Figure 4:
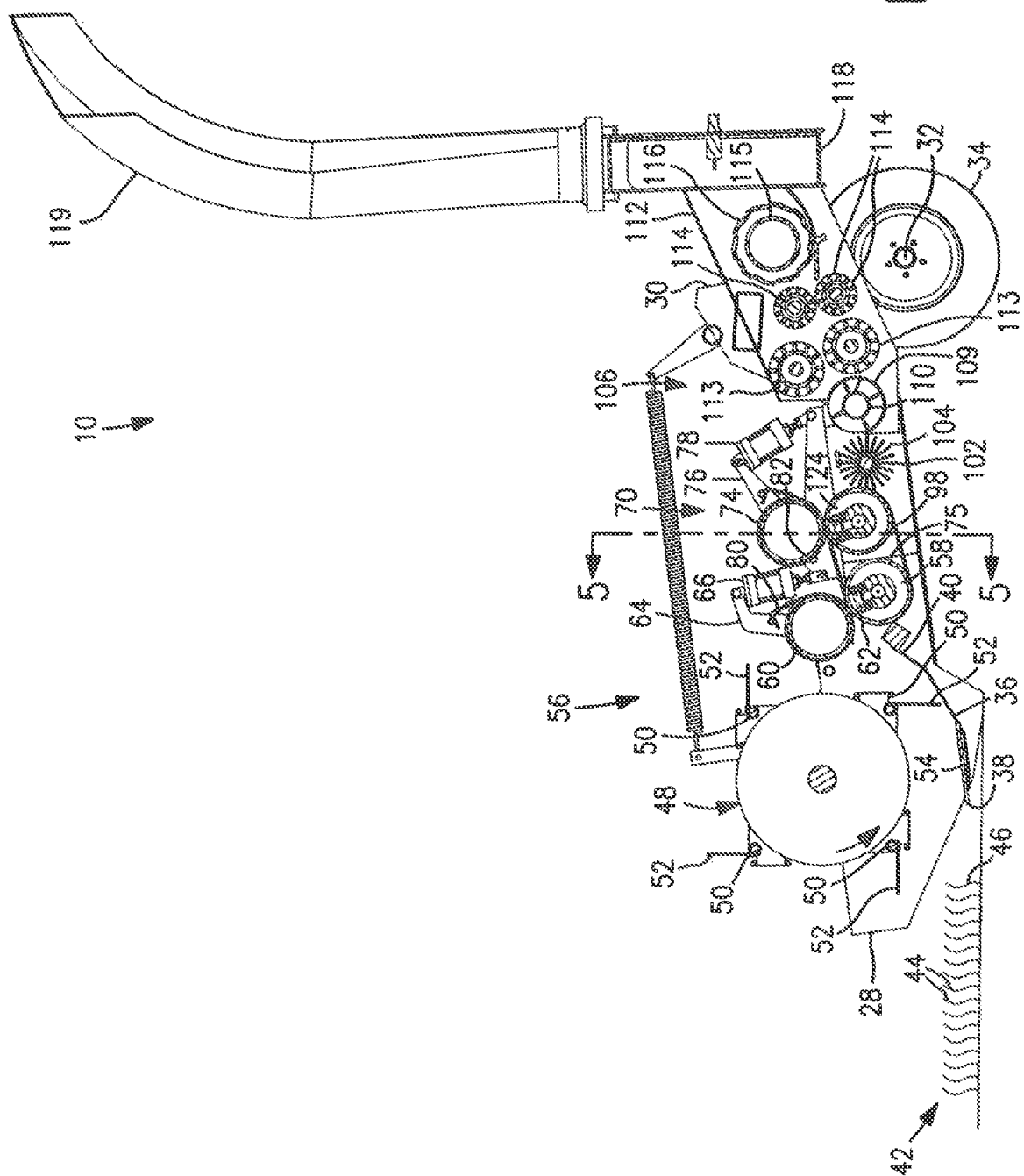
FIG. 4 is a side view of a portion of the harvesting machine, shown in FIG. 3, before the pair of augers.
Figure 5:
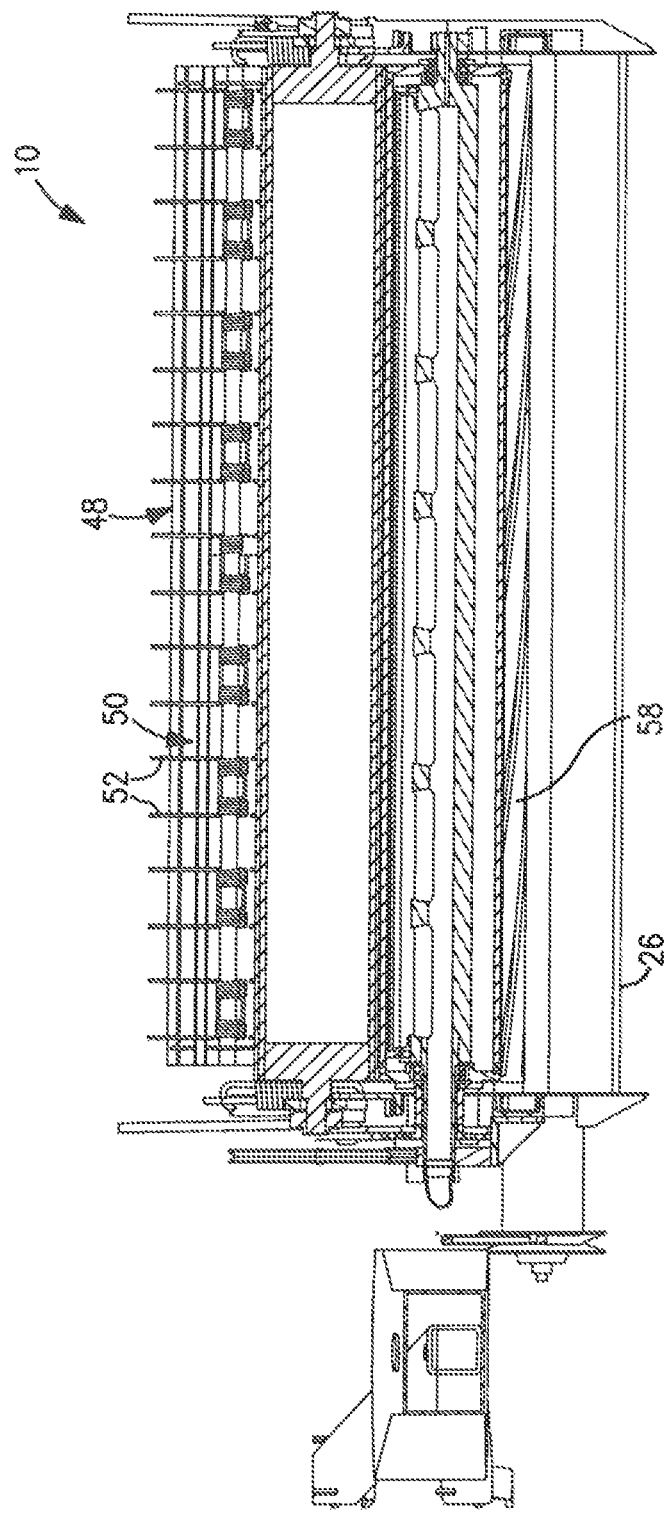
FIG. 5 is a vertical sectional view of FIG. 4 taken along line 5-5 looking towards the front of the harvesting machine.

Referring to FIG. 4, the harvesting machine 10 also has a bottom plate 36 positioned adjacent to the first end 28. The bottom plate 36 has a front edge 38 and a rear edge 40. The bottom plate 36 can be formed from a hard, strong material, such as but not limited to: steel, a steel alloy, metal, a metal alloy, etc. The bottom plate 36 can be an arcuate member or be formed having two or more angled sections. The bottom plate 36 is inclined upward towards the rear edge 40. The angle of inclination can range from between about 1° to about 45°. An angle of from between about 10° to about 30° works well. The bottom plate 36 functions to direct cut stems 44 of a plant 42, such as alfalfa, clover, or some other tall grass, into the harvesting machine 10, once each of the stems 42 have been cut or severed at its base 46.

It should be understood that other kinds of plants 42 could also be harvested using the harvesting machine 10 or 16.

Referring again to FIGS. 3-5, the harvesting machine 10 also includes a pick-up head 48 rotatably mounted adjacent to the first end 28 of the frame 26. The pick-up head 48 could be designed to pivot, if needed. The pick-up head 48 has at least two spaced apart and outwardly extending finger sets 50, 50. Four finger sets 50, 50, 50 and 50 are shown in FIG. 4 with each finger set 50, 50, 50 and 50 spaced approximately 90° apart. When two finger sets 50, 50 are utilized, each finger set 50, 50 can be spaced 180° apart. If three finger sets 50, 50 and 50 are utilized, each finger set 50, 50 and 50 can be spaced 120° apart. Each finger set 50 contains a plurality of fingers 52 spaced apart from one another across the width of the pick-up head 48. The width of the pick-up head 48 can vary. Usually, the width of the pick-up head 48 ranges from between about 72 inches to about 90 inches. Desirably, the width of the pick-up head 48 ranges from between about 76 inches to about 86 inches. More desirably, the width of the pick-up head 48 is about 82 inches. For a pick-up head 48 having an 82 inch width, the number of fingers 52 can range from between about 12 to about 30. Desirably, at least sixteen fingers 52 will span the 82 inch width of the pick-up head 48. More desirably, at least eighteen fingers 52 will span the 82 inch width of the pick-up head 48. The fingers 52 can be equally spaced apart or be arranged at various distances.

The size, shape and dimension of each of the fingers 52 can vary. Normally, each finger 52 can be shaped as an outward extending tine or prong having a length ranging from between about 4 to about 12 inches. Desirably, each finger 52 has an outwardly extending length of at least about 6 inches. Each finger 52 can include a coil spring section, or some other known configuration, to allow it to bend or flex during operation, see FIG. 4. Each finger 52 can be formed from a variety of strong and sturdy materials. Each finger 52 can be formed from various materials, including but not limited to: metal, a metal alloy, steel, a steel alloy, a composite material, fiberglass, plastic, nylon or some other material. As the pick-up head 48 is rotated in a counter-clockwise direction, each finger set 50 will sequentially contact the growing plants 42 in a field. The stem 44 of each plant 42 will contain a relatively high moisture content. By "relatively high moisture content" it is meant at least about 50%. The moisture content of a plant 42 can vary depending upon the age of the plant, the climate, the soil, and the time of year during which the plant 42 is being harvested. For alfalfa, clover and other tall grasses, the moisture content in the stems 44 can range from between about 50% to about 90%. Desirably, the moisture content in the stems 44 will range from between about 55% to about 75%. More desirably, the moisture content in the stems 44 will range from between about 60% to about 70%.

It should be understood that the leaves of an alfalfa plant contain only a small fraction of the moisture present in the plant 42. Therefore, the harvesting machine 10 focuses on reducing the moisture content of the stems 44, versus removing moisture from the leaves.

As the pick-up head 48 rotates counterclockwise, the finger sets 50 will contact the plants 42 and bend and direct the stems 44 downward onto the bottom plate 36. As the pick-up head 48 continues to rotate, the fingers 52 will move the cut stems 44 up the incline of the bottom plate 36.

Still referring to FIG. 4, the harvesting machine 10 further includes a cutting mechanism 54 mounted on the bottom plate 36 below the pick-up head 48. The cutting mechanism 54 can vary in size, shape and design and can be any cutting mechanism known to those skilled in the art. The cutting mechanism 54 could be a single blade or knife. More desirably, the cutting mechanism 54 is an arrangement of multiple cutting blades or knives. For example, the cutting mechanism 54 could include a plurality of reciprocating sickle blades, a plurality of oscillating blades or knives, multiple cutting heads, etc. The cutting mechanism 54 is designed to cut each of the stems 44 at its respective base 46 as the harvesting machine 10 traverses a crop field.

The harvesting machine 10 also includes a first moisture removal mechanism 56 positioned adjacent to the rear edge 40 of the bottom plate 36. The first moisture removal mechanism 56 includes a first suction roll 58 positioned below a first press roll 60, and a moving belt 98 which contacts the outer surface of the first suction roll 58, see FIG. 4. A first nip 62 is formed between the moving belt 98 and the first press roll 60.

The first suction roll 58 can be a drive roll which can be driven by a motor. The first suction roll 58 and the moving belt 98 rotate clockwise while the first press roll 60 rotates counterclockwise. The first press roll 60 is biased against the moving belt 98 and towards the first suction roll 58. The first press roll 60 can be biased against the moving belt 98 using a linkage 64 connected to a hydraulic cylinder 66, as is shown in FIG. 4. Alternatively, the hydraulic cylinder 66 could be replaced with a spring, an air cylinder, a pneumatic cylinder, or by some other mechanism known to those skilled in the art.

Still referring to FIG. 4, the linkage 64 is connected to an end of the first press roll 60. The hydraulic cylinder 66 is fixed between a stationary portion of the frame 26 and the linkage 64. The hydraulic cylinder 66 and linkage 64 can be adjusted to increase or decrease the amount of pressure the first press roll 60 will exert on the moving belt 98. The first press roll 60 is biased towards the belt 98 and the outer surface of the first suction roll 58. The first press roll 60 can be described as a follower roll wherein it follows the rotation of the moving belt 98, just in an opposite direction. The first press roll 60 is in contact with the moving belt 98 except when a moving web 68 of cut stems 44 passes therebetween through the first nip 62.

Figure 6:
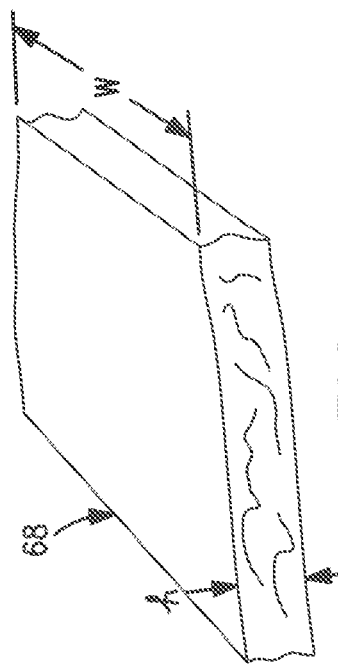
FIG. 6 is a perspective view of a moving web.

Referring to FIGS. 4 and 6, the first nip 62 is formed between the moving belt 98 and the first press roll 60. As the cut stems 44 are directed up the inclined surface of the bottom plate 36, a moving web 68 is formed. The fingers 52 direct the moving web 68 of cut stems 44 through the first nip 62, see FIG. 6. The height of the first nip 62 can vary. The height of the first nip 62 can range from between about 0.05 inches to about 0.5 inches. Desirably, the height of the first nip 62 can range from between about 0.1 inches to about 0.4 inches. More desirably, the height of the first nip 62 can range from between about 0.15 inches to about 0.35 inches. Even more desirably, the height of the first nip 62 is less than about 0.3 inches. Most desirably, the height of the first nip 62 is less than about 0.25 inches.

The first moisture removal mechanism 56 functions to remove from about 1% to about 25% of the moisture present in the stems 44 of the plants 42. In other words, the moisture content of the movable web 68 is being reduced by these percentages. Desirably, the first moisture removal mechanism 56 can remove from between about 5% to about 20% of the moisture present in the stems 44 of the plants 42. More desirably, the first moisture removal mechanism 56 can remove from between about 10% to about 18% of the moisture present in the stems 44 of the plants 42. Even more desirably, the first moisture removal mechanism 56 can remove from between about 10% to about 15% of the moisture present in the stems 44 of the plants 42. Most desirably, the first moisture removal mechanism 56 can remove up to about 15% of the moisture present in the stems 44 of the plants 42.

Still referring to FIG. 6, the moving web 68 can vary in height h and width w. The moving web 68 has a height h which ranges from between about 0.05 inches to about 0.25 inches. Desirably, the moving web 68 has a height h ranging from between about 0.05 to about 0.20 inches. More desirably, the moving web 68 has a height h ranging from between about 0.1 to about 0.2 inches. Even more desirably, the moving web 68 has a height h ranging from between about 0.1 to about 0.15 inches. Most desirably, the moving web 68 has a height h of less than about 0.13 inches.

The moving web 68 has a width w which can be equal to the width of the pick-up head 48. Alternatively, the moving web 68 has a width w which is less than the width of the pick-up head 48. In order to reduce the number of parts needed and to be able to construct the harvesting machine 10 at an economical cost, the moving web 68 usually has a width w which is approximately equal to the width of the pick-up head 48.

Referring again to FIGS. 3-5, the harvesting machine 10 further includes a second moisture removal mechanism 70 positioned downstream of the first moisture removal mechanism 56. The second moisture removal mechanism 70 includes a second suction roll 72 positioned below a second press roll 74, and the moving belt 98, see FIG. 4. The moving belt 98 surrounds both of the first and second suction rolls, 58 and 72 respectively. The moving belt 98 is continuous and forms a closed loop around the first and second suction rolls, 58 and 72 respectively. A second nip 75 is formed between the moving belt 98 and the second press roll 74. The second suction roll 72 can be a drive roll which can be driven by a motor. Only one of the first and second suction rolls, 58 and 72 respectively, needs to be a drive roll. The second suction roll 72 and the moving belt 98 are rotated clockwise while the second press roll 74 rotates counterclockwise. The second press roll 74 is biased against the moving belt 98 and towards the second suction roll 72. The second press roll 74 can be biased against the moving belt 98 using a linkage 76 connected to a hydraulic cylinder 78, as is shown in FIG. 4. Alternatively, the hydraulic cylinder 78 could be replaced with a spring, an air cylinder, a pneumatic cylinder, or by some other mechanism known to those skilled in the art.

Still referring to FIG. 4, the linkage 76 can be connected to an end of the second press roll 74. The hydraulic cylinder 78 is fixed between a stationary portion of the frame 26 and the linkage 76. The hydraulic cylinder 78 and linkage 76 can be adjusted to increase or decrease the amount of pressure the second press roll 74 will exert on the moving belt 98. The second press roll 74 contacts the moving belt 98 when no crop is passing through the second nip 75. The second press roll 74 can be described as a follower roll wherein it follows the rotation of the moving belt 98 and the second suction roll 72, just in an opposite direction. The second press roll 74 rotates counterclockwise.

Still referring to FIG. 4, the first nip 62 is formed between the moving belt 98 and the first press roll 60. The cut stems 44, in the form of a moving web 68, are directed up the inclined surface of the bottom plate 36 by the fingers 52. The moving web 68 is then directed through the first nip 62, see FIG. 6. The height of the first nip 62 can vary. The height of the first nip 62 can range from between about 0.05 inches to about 0.5 inches. Desirably, the height of the first nip 62 can range from between about 0.1 inches to about 0.4 inches. More desirably, the height of the first nip 62 can range from between about 0.15 inches to about 0.35 inches. Even more desirably, the height of the first nip 62 is less than about 0.3 inches. Most desirably, the height of the first nip 62 is less than about 0.25 inches.

The second moisture removal mechanism 70 functions to remove from between about 1% to about 15% of additional moisture from the stems 44 which have passed through the first moisture removal mechanism 56. Desirably, the second moisture removal mechanism 70 can remove from between about 3% to about 15% of the additional moisture present in the stems 44 which have passed through the first moisture removal mechanism 56. More desirably, the second moisture removal mechanism 70 can remove from between about 5% to about 14% of the additional moisture present in the stems 44 which have passed through the first moisture removal mechanism 56. Even more desirably, the second moisture removal mechanism 70 can remove from between about 6% to about 12% of the additional moisture present in the stems 44 which have passed through the first moisture removal mechanism 56. Most desirably, the second moisture removal mechanism 70 can remove up to about 10% of the additional moisture present in the stems 44 which have passed through the first moisture removal mechanism 56.

It should be understood that a third moisture removal mechanism (not shown) could be added downstream of the second moisture removal mechanism 70, if desired. The third moisture removal mechanism could remove from between about 1% to about 10% of the additional moisture present in the stems 44 which have passed through the second moisture removal mechanism 70. Desirably, the third moisture removal mechanism 70 can remove from between about 2% to about 10% of the additional moisture present in the stems 44 which have passed through the second moisture removal mechanism 70. More desirably, the third moisture removal mechanism can remove from between about 3% to about 10% of the additional moisture present in the stems 44 which have passed through the second moisture removal mechanism 70. Even more desirably, the third moisture removal mechanism can remove from between about 4% to about 9% of the additional moisture present in the stems 44 which have passed through the second moisture removal mechanism 70. Most desirably, the third moisture removal mechanism 70 can remove up to about 10% of the additional moisture present in the stems 44 which have passed through the second moisture removal mechanism 70.

Figure 7:
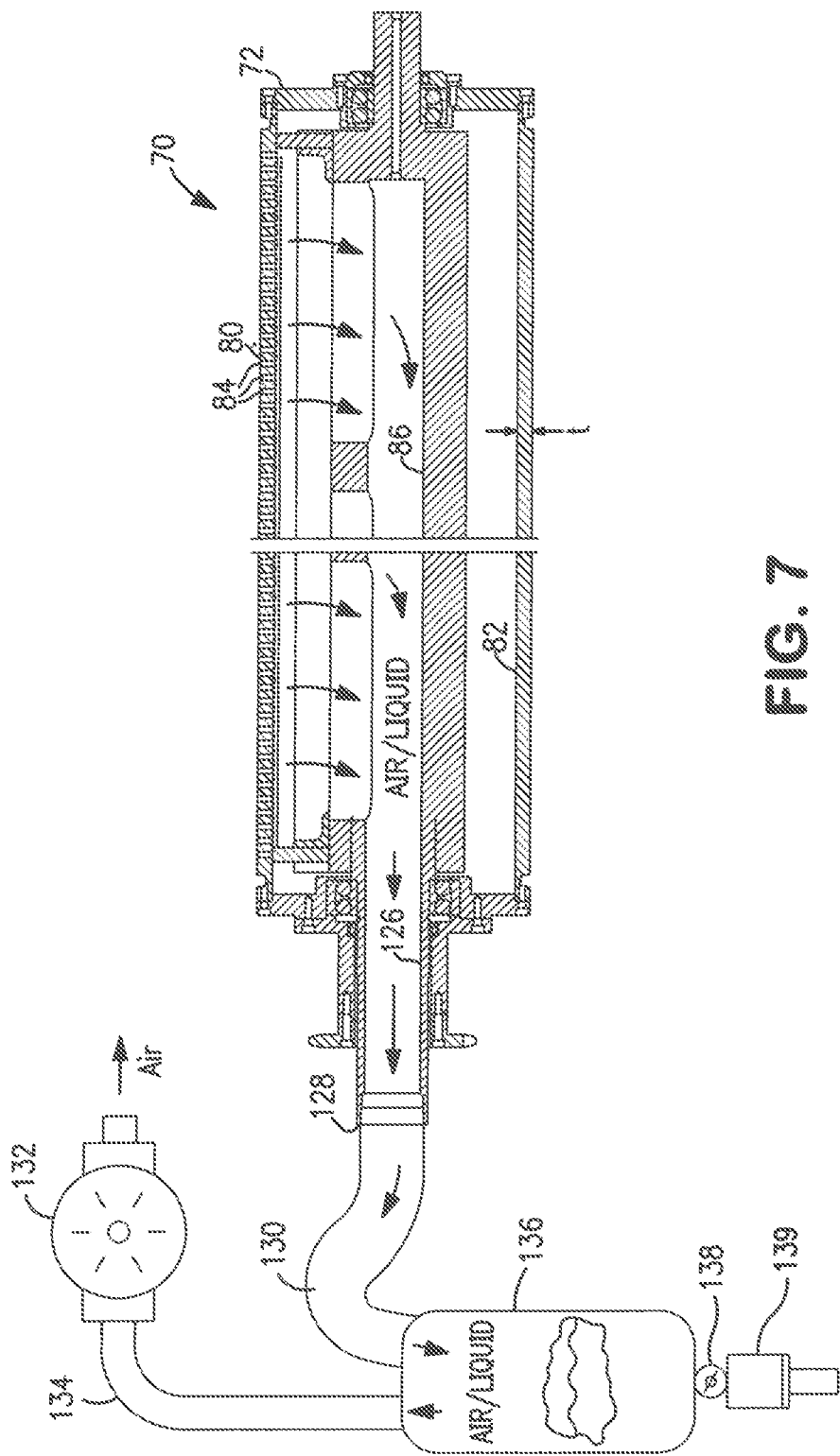
FIG. 7 is a cross-sectional view of the suction roll.
Figure 8:
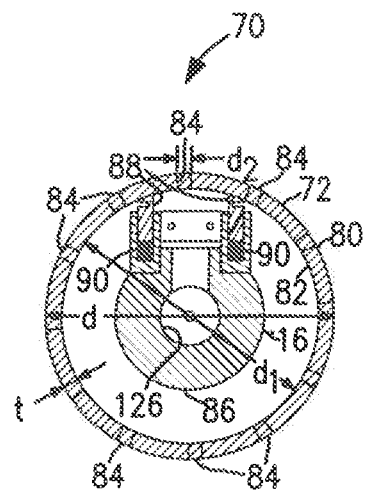
FIG. 8 is a vertical section view of the suction roll taken along line 8-8.

Referring now to FIGS. 7 and 8, the first and second suction rolls, 58 and 72 respectively, can be identical in shape, design and construction. Alternatively, each of the first and second suction rolls, 58 and 72 respectively, can be different from one another. In addition, the first and second press rolls, 60 and 74 respectively, can have the same diameter or vary in diameter. The diameter of the second suction roll 72 can be made larger, be the same, or be made smaller than the diameter of the first suction roll 58. Likewise, the diameter of the first press roll 60 can be made larger, be the same, or be made smaller than the diameter of the second press roll 74. Desirably, the diameters of the first and second suction rolls, 58 and 72 respectively, and the diameters of the first and second press rolls, 60 and 74 respectively, are the same.

One will notice that in FIG. 4, the second moisture removal mechanism 70 is inclined relative to the first moisture removal mechanism 56. In other word, the second moisture removal mechanism 70 is at an elevated height relative to the first moisture removal mechanism 56. In addition, the first moisture removal mechanism 56 is positioned in front of and slightly below the second moisture removal mechanism 70. Likewise, the first suction roll 58 is positioned in front of and slightly below the second suction roll 72, and first press roll 60 is positioned in front of and slightly below the second press roll 74. If desired, the first and second suction rolls, 58 and 72 respectively, and the first and second press rolls, 60 and 74 respectively, can be aligned along a common horizontal axis.

Figure 9:
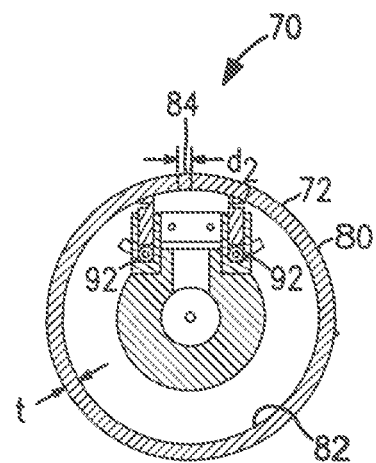
FIG. 9 is a cross-sectional view of the suction roll shown in FIG. 7 showing a pair of air load tubes used to bias the pair of seals outward against the interior surface of the suction roll.

Referring to FIGS. 7-9, the first and second moisture removal mechanisms, 56 and 70 respectively, will be described as being identical in size and overall construction. This means that the first suction roll 58 is identical to the second suction roll 72, and the first press roll 60 is identical to the second press roll 74. The first suction roll 58 will perform identically to the second suction roll 72. The second suction roll 72 will be explained in detail since it is shown in these figures. The second suction roll 72 is a hollow cylinder or tube which can be formed from various materials. Desirably, the second suction roll 72 is formed from aluminum or an aluminum alloy. The second suction roll 72 has an outside diameter d and an inside diameter $d_1$, see FIG. 8. The outside diameter d of the second suction roll 72 can range from between about 8 inches to about 12 inches. Desirably, the outside diameter d of the second suction roll 72 is greater than about 9 inches. More desirably, the outside diameter d of the second suction roll 72 ranges from between about 9 inches to about 10 inches. Even more desirably, the outside diameter d of the second suction roll 72 is about 9.5 inches.

It should be understood that the above second suction roll 72 diameters are for a harvesting machine 10 with cutting widths of about 80 inches. As the cutting width of the harvesting machine 10 increases, the diameters of the first and second suction rolls, 58 and 72 diameter respectively, will also increase. A typical rule of thumb for suction roll diameter is to use a 10/1 ratio as a minimum (for example, an 80 inch long suction roll would be have an 8 inch diameter). For the self-propelled harvesting machine 16, the cutting widths can go up to about 20 feet (240 inches) or greater. In these types of harvesting machines 16, the diameters of the first and second suction rolls, 58 and 72 respectively, could be about 24 inches or greater.

The inside diameter $d_1$ of the second suction roll 72 can range from between about 0.1 inches to about 0.3 inches less than the outside diameter d. Desirably, the inside diameter $d_1$ of the second suction roll 72 ranges from between about 7.7 inches to about 11.9 inches. More desirably, the inside diameter $d_1$ of the second suction roll 72 is greater than about 8.7 inches.

The thickness t of the second suction roll 72 can range from between about 0.1 inches to about 0.3 inches, see FIG. 8. Desirably, the thickness t of the second suction roll 72 ranges from between about 0.15 inches to about 0.25 inches. More desirably, the thickness t of the second suction roll 72 ranges from between about 0.18 inches to about 0.25 inches. Even more desirably, the thickness t of the second suction roll 72 ranges from between about 0.2 inches to about 0.25 inches.

The second suction roll 72 has an exterior surface 80, an interior surface 82, and a circumference. A plurality of apertures 84 are formed through the thickness t of the hollow, second suction roll 72. The apertures 84 can vary in size and/or diameter. Desirably, each of the plurality of apertures 84 has a circular configuration. It is also desirable that each of the plurality of apertures 84 has the same diameter. Each of the plurality of apertures 84 has a diameter $d_2$. The diameter $d_2$ is relatively small and can vary. The diameter $d_2$ of each of the plurality of apertures 84 can range from between about 0.05 inches to about 0.25 inches. Desirably, the diameter $d_2$ of each of the plurality of apertures 84 ranges from between about 0.1 inches to about 0.2 inches. More desirably, the diameter $d_2$ of each of the plurality of apertures 84 ranges from between about 0.15 inches to about 0.2 inches. Even more desirably, the diameter $d_2$ of each of the plurality of apertures 84 is less than about 0.25 inches.

If desired, some of the plurality of apertures 84 could be formed to have different diameters but this would increase the cost of manufacturing the second suction roll 72.

Still referring now to FIGS. 7-9, a stationary member 86 is positioned within the hollow, second suction roll 72. The stationary member 86 can vary in construction. The stationary member 86 includes a pair of seals 88, 88 arranged to form an opening into a center portion of the stationary member 86. The size, shape and design of each of the pair of seals 88, 88 can vary. Each of the pair of seals 88, 88 is movable and each is biased outward against the interior surface 82 of the hollow, second suction roll 72. Each of the pair of seals 88, 88 can be biased outward against the interior surface 82 of the hollow, second suction roll 72 by a spring 90. Alternatively, each of the pair of seals 88, 88 can be biased outward against the interior surface 82 of the hollow, second suction roll 72 by a pair of air load tube 92, 92, see FIG. 9. Furthermore, each of the pair of seals 88, 88 can be biased outward against the interior surface 82 of the hollow, second suction roll 72 by some other mechanism known to those skilled in the art.

The pair of seals 88, 88 can be formed from various materials. An excellent material from which to form the pair of seals 88, 88 is a high-strength, resilient synthetic polymer. A particular polymer from which the pair of seals 88, 88 can be formed is nylon. By "nylon" it is meant any of a family of high-strength, resilient synthetic polymers containing recurring amide groups. Various types of nylon can also be used since seals containing nylon tend to be strong, resilient and pliable. The pair of seals 88, 88 could also be formed from other materials known to those skilled in the art.

The purpose of the pair of seals 88, 88 is to form a small zone of negative pressure within the stationary member 86. The stationary member 86 is designed to pull a vacuum or negative pressure so that moisture, in the form of a liquid, can be drawn out of the stems 44 in the moving web 68 and be removed through the second suction roll 72 and the stationary member 86. The stationary member 86 can be constructed to pull a negative pressure ranging from between about −5 pounds per square inch (psi) to about −10 psi. Desirably, the stationary member 86 should be built and designed to pull a negative pressure ranging from between about −6 psi to about −9 psi. More desirably, the stationary member 86 should be built and designed to pull a negative pressure of at least −7 psi. Even more desirably, the stationary member 86 should be built and designed to pull a negative pressure of at least −8 psi. Most desirably, the stationary member 86 should be built and designed to pull a negative pressure of at least −9 psi.

Returning again to FIG. 4, as stated above, the first and second press rolls, 60 and 74 respectively, are identical in diameter, design, construction and function. The diameter of the second press roll 60 can be made larger, be made the same size, or be made smaller than the diameter of the first press roll 74. Desirably, the diameter of the first and second press rolls, 60 and 74 respectively, are the same.

Still referring to FIG. 4, for ease with understanding this invention, the first and second press rolls, 60 and 74 respectively, will be identical in size and appearance. The second press roll 74 will be explained in detail. The first press roll 60 will perform identically to the second press roll 74. The second press roll 74 can be formed from various materials. Desirably, the second press roll 74 is a steel roll coated with rubber. The second press roll 74 can be biased against the moving belt 98 and towards the second suction roll 72 by various means, such as by a mechanical device. The mechanical device can be a spring, a hydraulic cylinder, a pneumatic cylinder, by air pressure, by a mechanical/electrical device, or by some other means known to those skilled in the art. As explained above, a linkage 76 is connected to a hydraulic cylinder 78 and the hydraulic cylinder 78 is used to bias the second press roll 74 against the moving belt 98. One end of the hydraulic cylinder 78 can be secured to a portion of the frame 26 and the opposite end of the hydraulic cylinder 78 is attached to the linkage 76. The linkage 76 is connected to an end of the second press roll 74. One can adjust the amount of pressure the second press roll 74 will apply against the moving belt 98 and towards the second suction roll 72 by adjusting the setting of the hydraulic cylinder 78 and/or adjusting the linkage 76.

The second press roll 74 can have a smaller diameter, the same diameter, or a larger diameter than the second suction roll 72. Desirably, the second press roll 74 will have the same diameter or a larger diameter than the second suction roll 72. More desirably, the second press roll 74 has a larger diameter than the second suction roll 72. For example, if the second suction roll 72 has a diameter d of 9.5 inches, the second press roll 74 can have a diameter ranging from about 9.6 to about 10 inches. By constructing the second press roll 74 to have an equal or slightly larger diameter than the second suction roll 72, one can better control the amount of pressure the second press roll 74 will exert on the moving belt 98.

Desirably, the first and second press rolls, 60 and 74 respectively, and the first and second suction rolls, 58 and 72 respectively, will have the same length so as to easily fit into the harvesting machine 10. Each of the first and second press rolls, 60 and 74 respectively, can be adjusted to exert a pressure ranging from between about 50 pounds per linear inch (pli) to about 100 pli against the moving belt 98 and towards each of the first and second suction rolls, 58 and 72 respectively. Desirably, each of the first and second press rolls, 60 and 74 respectively, can be adjusted to exert a pressure ranging from between about 60 pli to about 90 pli against the moving belt 98. More desirably, each of the first and second press rolls, 60 and 74 respectively, can be adjusted to exert a pressure ranging from between about 65 pli to about 85 pli against the moving belt 98. Even more desirably, each of the first and second press rolls, 60 and 74 respectively, can be adjusted to exert a pressure of at least 70 pli against the moving belt 98. Most desirably, the each of first and second press rolls, 60 and 74 respectively, can be adjusted to exert a pressure of at least 75 pli against the moving belt 98.

The press action between the first suction roll 58, the moving belt 98 and the first press roll 60, and the press action between the second suction roll 72, the moving belt 98 and the second press roll 74, squeezes the plant stems 44. This squeezing action, in combination with the rolling action of the moving belt 98 against the first press roll 60 and the rolling action of the moving belt 98 against the second press roll 74 squeezes the moisture (liquid) out of the plant stems 44. The released liquid is then drawn into the interior of the first and second suction rolls, 58 and 72 respectively.

Figure 10:
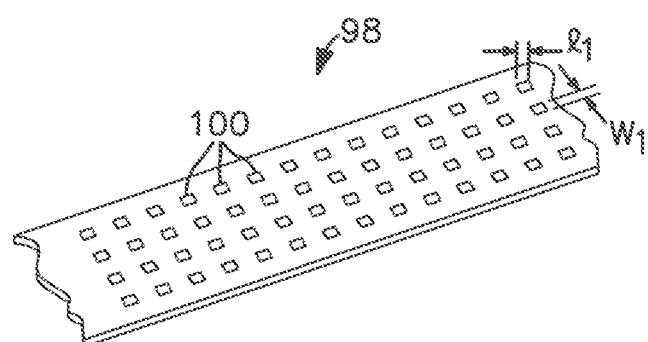
FIG. 10 is a top view of a section of a wire belt having a plurality of apertures formed therethrough.

Referring now to FIGS. 4 and 10, the moving belt 98 forms a continuous, closed loop around both the first and second suction rolls, 58 and 72 respectively. The moving belt 98 functions to move the moving web 68 of cut stems 44 through the first and second moisture removal mechanisms, 56 and 70 respectively. The orientation of the moving belt 98, located between the first and second suction rolls, 58 and 72 respectively, can be at a slight incline. Alternatively, the moving belt 98 can be aligned a horizontally axis. The moving belt 98 is movable in a clockwise direction and is driven by at least one of the first or second suction rolls, 58 or 72 respectively.

The moving belt 98 can be formed from various materials. For example, the moving belt 98 can be formed from plastic, urethane, polypropylene, polyethylene, or any material known to those skilled in the art. Additionally, the moving belt 98 could be formed by weaving fine metal or steel wires into a screen. The moving belt 98 could also be formed from thin strands of a thermoplastic or a composite material which are formed into a screen. Furthermore, the moving belt 98 could also be formed from a corrosion resistant material, such as stainless steel.

The moving belt 98 contains a plurality of apertures 100 formed therethrough. The apertures 100 can be relatively small and vary in size, shape and dimensions. The plurality of apertures 100 can be of the same size or be of a different size. Normally, all of the apertures 100 are of the same size and shape. The geometry of the apertures 100 can vary. For example, the apertures 100 can be rectangular, square or circular in shape. Additionally, the apertures 100 could have an irregular configuration. The apertures 100 can be formed when the belt 98 is constructed. Alternatively, the apertures 100 can be formed after the belt 98 is constructed, such as by punching the apertures 100.

The apertures 100 can form an open area of from between about 20% to about 50% in the surface area of the moving belt 98. For example, the apertures 100 can form about 20%, about 25%, about 30%, about 35%, about 40%, about 45% or about 50% open area in the surface of the moving belt 98. For an aperture 100 having a circular configuration, each aperture 100 can have a diameter ranging from between about 0.05 inches to about 0.2 inches. Desirably, a circular aperture 100 can have a diameter ranging from between about 0.08 inches to about 0.15 inches. More desirably, a circular aperture 100 can have a diameter ranging from between about 0.1 inches to about 0.13 inches. Even more desirably, a circular aperture 100 can have a diameter of less than about 0.14 inches. Most desirably, a circular aperture 100 can have a diameter of about 0.12 inches.

Referring again to FIG. 10, for an aperture 100 having a rectangular configuration, each aperture 100 can have a length ranging from between about 0.025 inches to about 0.035 inches, and a width $w_1$ ranging from about 0.01 inches to about 0.02 inches. Desirably, for an aperture 100 having a rectangular configuration, each aperture 100 can have a length ranging from between about 0.027 inches to about 0.033 inches, and a width $w_1$ ranging from about 0.012 inches to about 0.019 inches. More desirably, for an aperture 100 having a rectangular configuration, each aperture 100 can have a length ranging from between about 0.028 inches to about 0.032 inches, and a width $w_1$ ranging from about 0.017 inches to about 0.018 inches. Even more desirably, each rectangular shaped aperture 100 can have a length of about 0.032 inches and a width $w_1$ of about 0.018 inches. A preferred size is an aperture 100 having a length of about 0.03 inches, and a width $w_1$ of about 0.01 inches.

It should be understood that each of the plurality of apertures 100 formed in the moving belt 98 is at least about 25% smaller in area than each of the apertures 84 formed in the second suction roll 72. Desirably, each of the plurality of apertures 100 formed in the moving belt 98 is at least about 30% smaller in area than each of the apertures 84 formed in the second suction roll 72. More desirably, each of the plurality of apertures 100 formed in the belt 98 is at least about 40% smaller in area than each of the apertures 84 formed in the second suction roll 72. Even more desirably, each of the plurality of apertures 100 formed in the belt 98 is at least about 50% smaller in area than each of the apertures 84 formed in the second suction roll 72. Most desirably, each of the plurality of apertures 100 formed in the belt 98 is at least about 60% smaller in area than each of the apertures 84 formed in the second suction roll 72. This is important, because the plurality of apertures 100 formed in the moving belt 98 will prevent debris from the cut stems 44 from entering the apertures 84 formed in the second suction roll 72. By forming each of the apertures 100 to a smaller size than the apertures 84, one can be assured that no large particles of debris will enter the apertures 84 formed in the second suction roll 72, and fowl them up.

It should be understood that the first suction roll 58 is identical in construction to the second suction roll 72, and therefore no debris will enter the apertures formed in the first suction roll 58 either.

The moving belt 98 is made movable by spanning a portion of the circumference of the first and second suction rolls, 58 and 72 respectively. Only one of the first and second suction rolls, 58 and 72 need be a driven roll. Desirably, the moving belt 98 will span at least about 180° of the circumference of each of the first and second suction rolls, 58 and 72 respectively. More desirably, the belt 98 will span 180° of the circumference of each of the first and second suction rolls, 58 and 72 respectively.

It should be understood that each of the plurality of apertures 100 formed in the belt 98 is smaller than each of the plurality of apertures 84 formed in the second suction roll 72. This is an important feature for it assures that none of the stems 44 or portions thereof will be sucked into the suction roll 72 through the apertures 84.

Referring again to FIG. 4, one can see that the second nip 75 is formed between the second press roll 74 and the moving belt 98. The size of this second nip 75 can vary. The size of the second nip 75 can range from between about 0.05 inches to about 0.5 inches. Desirably, the size of the second nip 75 can range from between about 0.1 inches to about 0.4 inches. More desirably, the size of the second nip 75 can range from between about 0.15 inches to about 0.35 inches. Even more desirably, the size of the second nip 75 is less than about 0.3 inches. Most desirably, the size of the second nip 75 is less than about 0.25 inches.

The moving belt 98 functions as a conveyor for moving the moving web 68 of cut stems 44 through the first and second nips, 62 and 75 respectively. As the moving web 68 passes through the second nip 75, the moisture content in the cut stems 44 is lowered and reduced. A standing crop of alfalfa, and certain tall grasses, in a field can have a relative high moisture content. By a "relative high moisture content" it is meant a moisture content of at least about 50%. Desirably, a standing crop of alfalfa can have a moisture content ranging from between about 50% to about 90%. Depending upon the time of year, the soil makeup, the time of day when the alfalfa is being harvested, the kind of weather the alfalfa is being harvested in, the time of year in which the alfalfa is being harvested, the variety of alfalfa, the geographical location of the farm, etc., a standing crop of alfalfa in a field can have a moisture content ranging from between about 50% to about 85%. Desirably, a standing crop of alfalfa in a field can have a moisture content ranging from between about 50% to about 80%. More desirably, a standing crop of alfalfa in a field can have a moisture content ranging from between about 50% to about 75%. Even more desirably, a standing crop of alfalfa in a field can have a moisture content of at least about 55%. Most desirably, a standing crop of alfalfa in a field can have a moisture content of at least about 60%.

By harvesting the alfalfa crop and certain tall grasses with the harvesting machine 10 or 16, one can lower or reduce the moisture content in the cut stems 44 from between about 10% to about 50%. Desirably, by harvesting the alfalfa and certain tall grasses with the harvesting machine 10 or 16, one can lower or reduce the moisture content in the cut stems 44 from between about 15% to about 45%. More desirably, by harvesting the alfalfa and certain tall grasses with the harvesting machine 10 or 16, one can lower or reduce the moisture content in the cut stems 44 from between about 20% to about 40%. Even more desirably, by harvesting the alfalfa and certain tall grasses with the harvesting machine 10 or 16, one can lower or reduce the moisture content in the cut stems 44 by at least about 30%. Most desirably, by harvesting the alfalfa and certain tall grasses with the harvesting machine 10 or 16, one can lower or reduce the moisture content in the cut stems 44 by at least about 25%. Even more desirably, by harvesting the alfalfa and certain tall grasses with the harvesting machine 10 or 16, one can lower or reduce the moisture content in the cut stems 44 by at least about 20%.

The first moisture removal mechanism 56 can remove at least about 20% of the moisture content in the cut stems 44. Desirably, the second moisture removal mechanism 70 can remove at least about 10% of the additional moisture content in the cut stems 44. More desirably, the first and second moisture removal mechanisms, 56 and 70 respectively, can remove at least about 30% of the moisture content in the cut stems 44.

The moisture contained in the stems 44 of an alfalfa plant 42 and the moisture contained in the stems 44 of certain tall grasses can be removed by the harvesting machine 10 or 16 in the form of a liquid. The leaves of the alfalfa plant 42 and the tips of certain tall grasses usually contain only a very small amount of moisture. Because of this, the harvesting machine 10 or 16 extracts moisture from the cut stems 44 and not from the leaves of the plant 42. The liquid removed from the cut stems 44 has a nutritional value. Therefore, it is advantageous to capture this liquid and use it as a feed supplement, as a fertilizer, or for some other purpose. The liquid that is removed could also be deposited back onto the field from which the alfalfa was harvested and be used as a fertilizer. By "fertilizer" it is meant any of a large number of natural and synthetic materials, including manure and nitrogen, phosphorous, and potassium compounds, spread on or worked into soil to increase its capacity to support plant growth.

Still referring to FIG. 4, a rotatable brush 102 is shown having a plurality of outwardly extending bristles 104. The rotary brush 102 is located downstream of the second suction roll 72 and contacts the moving belt 98. The rotatable brush 102 extends the full width of the moving belt 98. The rotatable brush 102 rotates clockwise. The diameter of the rotatable brush 102 can vary, as well as the material from which the brush 102 is constructed. The bristles 104 should be formed from a stiff and flexible material. The bristles 104 can be formed from plastic, thermoplastic, nylon, or any other material known to those skilled in the art.

The rotatable brush 102 can have a diameter ranging from between about 5 inches to about 12 inches. Desirably, the diameter of the rotatable brush 102 will range from between about 6 inches to about 10 inches. More desirably, the diameter of the rotatable brush 102 will range from between about 6 inches to about 8 inches. Even more desirably, the diameter of the rotatable brush 102 will be less than about 9.5 inches. Most desirably, the diameter of the rotatable brush 102 will be at about 7 inches.

The bristles 104 on the rotatable brush 102 contact the moving belt 98 and function to remove small debris, such as leaves, stems, etc. that may have become lodged in the apertures 100 of the moving belt 98. The bristles 104 of the rotatable brush 102 also contact the leading edge of an auger housing 109, which will be explained below.

Figure 3:
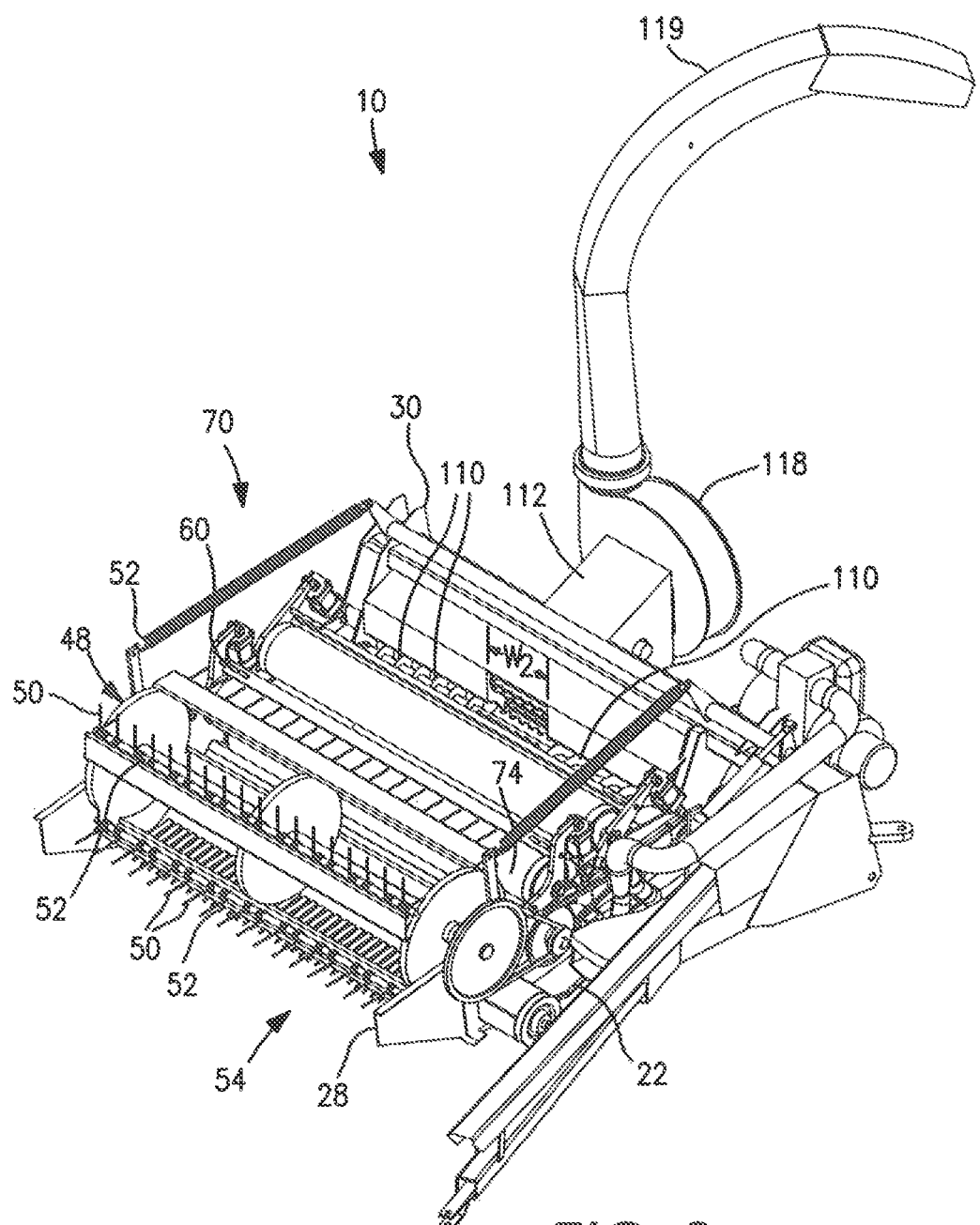
FIG. 3 is a perspective view of the harvesting machine having a pair of suction and press rolls.
Figure 11:
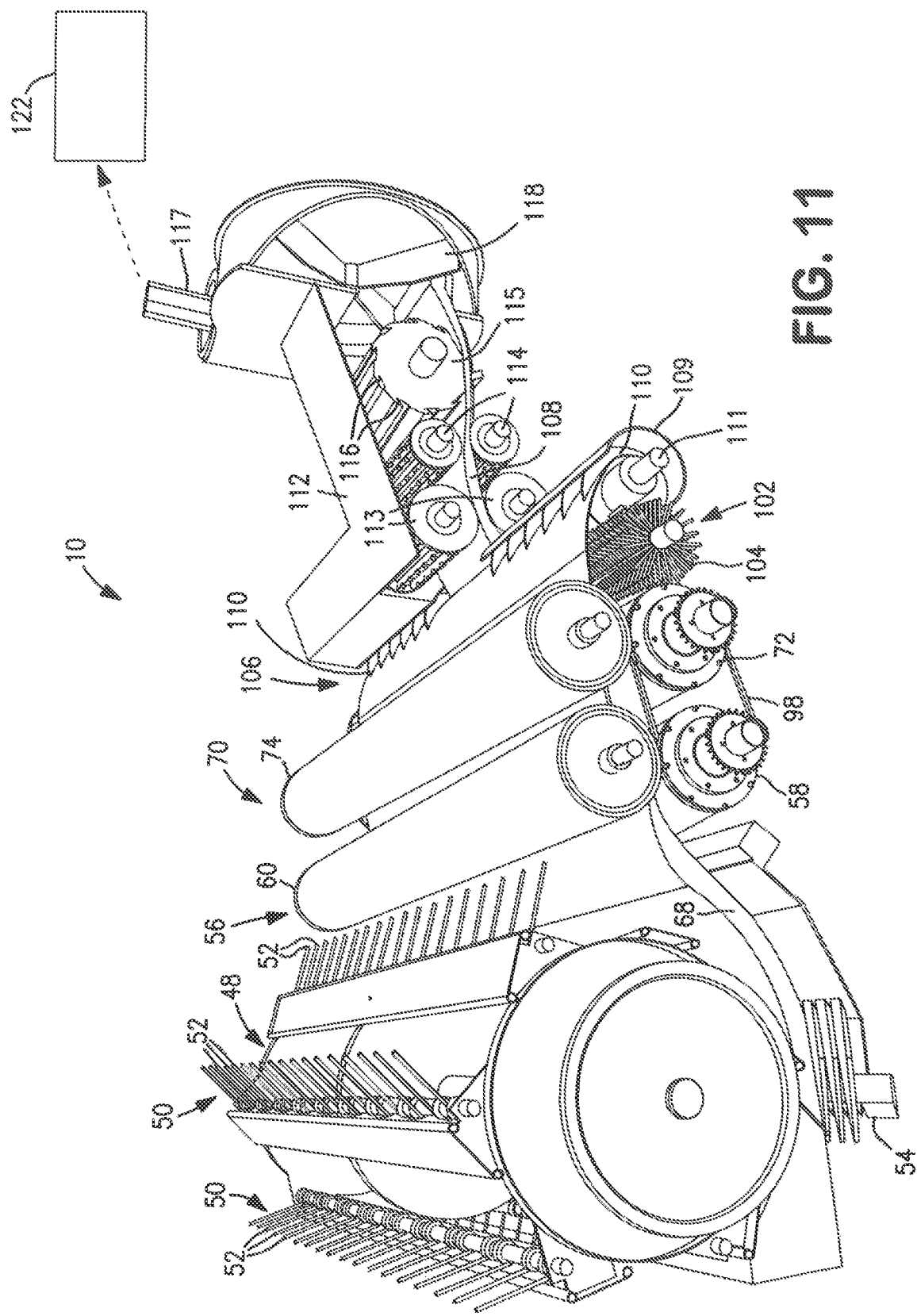
FIG. 11 is a perspective view of the crop converging mechanism.

Referring now to FIGS. 3 and 11, a crop converging mechanism 106 is located downstream of the second moisture removal mechanism 70. The crop converging mechanism 106 reduces the width of moving web 68 into a narrow ribbon 108 having a width $w_2$, see FIG. 3. The narrow ribbon 108 has a width $w_2$ of about 30 inches or less. Desirably, the ribbon 108 has a width $w_2$ of about 28 inches or less. More desirably, the narrow ribbon 108 has a width $w_2$ of about 26 inches or less. Even more desirably, the narrow ribbon 108 has a width $w_2$ of about 24 inches. The crop converging mechanism 106 can vary in construction and size.

As depicted in FIG. 11, the crop converging mechanism 106 includes an auger housing 109 in which a pair of rotatable augers 110, 110 are housed. The pair of rotatable augers 110, 110 is aligned on a common shaft 111. Each of the pair of augers 110, 110 is aligned on a common axis. One auger 110 can be a right-handed auger and the other auger 110 can be a left-handed auger. As the shaft 111 rotates, the pair of augers 110, 110 function to reduce the width of the moving web 68. The pair of augers 110, 110 can forcibly reduce the moving web 68 into a narrow ribbon 108 having a desired width $w_2$. One or more moving belts or some other kind of mechanical equipment, known to those skilled in the art, could also be used in place of the pair of augers 110, 110 to reduce the width of the moving web 68 into a narrow ribbon 108 having a width $w_2$.

Referring again to FIGS. 1 and 11, the harvesting machine 10 or 16 further includes a conveyor chute 112 positioned downstream of the crop converging mechanism 106. The conveyor chute 112 is sized to handle the narrow ribbon 108 of cut stems 44. The conveyor chute 112 can be constructed of various materials. Typical materials include steel, a steel alloy, metal, a metal alloy or any other material known to those skilled in the art. The conveyor chute 112 can house a first pair of feed rolls 113, 113, a second pair of feed rolls 114, 144, if needed, and a chopper 115. The first and second pairs of feed rolls 113, 113 and 114, 114 functions to route the narrow ribbon 108 of cut stems 44 to a chopper 115. The chopper 115 is positioned downstream of the crop converging mechanism 106 and towards the opposite end of the conveyor chute 112. The chopper 115 can be a rotary knife or other kind of cutting apparatus known to those skilled in the art. The chopper 115 can include several cutting blades 116. The chopper 115 is designed to chop the narrow ribbon 108 of cut stems 44 into small pieces 117. A blower 118 is positioned downstream of the chopper 115 and is designed to blow or move the small pieces 117 up and through a spout 119, see FIG. 1. The spout 119 can route the small pieces 117 into a storage wagon 120 for transport to a storage facility 122, such as a silo or grain bin, see FIG. 11.

Returning again to FIG. 4, a doctor blade 124 is positioned adjacent to the exterior surface of the second press roll 74 and downstream of the second nip 75. The doctor blade 124 can be formed from various materials. Usually, the doctor blade 124 is formed from steel or metal. The doctor blade 124 can physically contact or touch the exterior surface of the second press roll 74 or be slightly removed from the exterior surface 80. Desirably, the doctor blade 124 physically contacts the exterior surface of the second press roll 74. Alternatively, the doctor blade 124 is situated within about 0.125 inches of the exterior surface of the second press roll 74. The doctor blade 124 can vary in configuration and thickness but should generally be a rectangular blade equivalent to the blade on a putty knife. The thickness of the doctor blade 124 can range from between about 0.10 inches to about 0.20 inches. The doctor blade 124 is located downstream of the second nip 75. The doctor blade 124 is a stationary member which functions to remove any stems 44, particles, debris or portions thereof, that may cling to the exterior surface of the second press roll 74. In essence, the doctor blade 124 keeps the exterior surface of the second press roll 74 clean and free of particles and debris. As depicted, the doctor blade 124 can be positioned from about 2 inches to about 4 inches above the moving belt 98.

Figure 12:
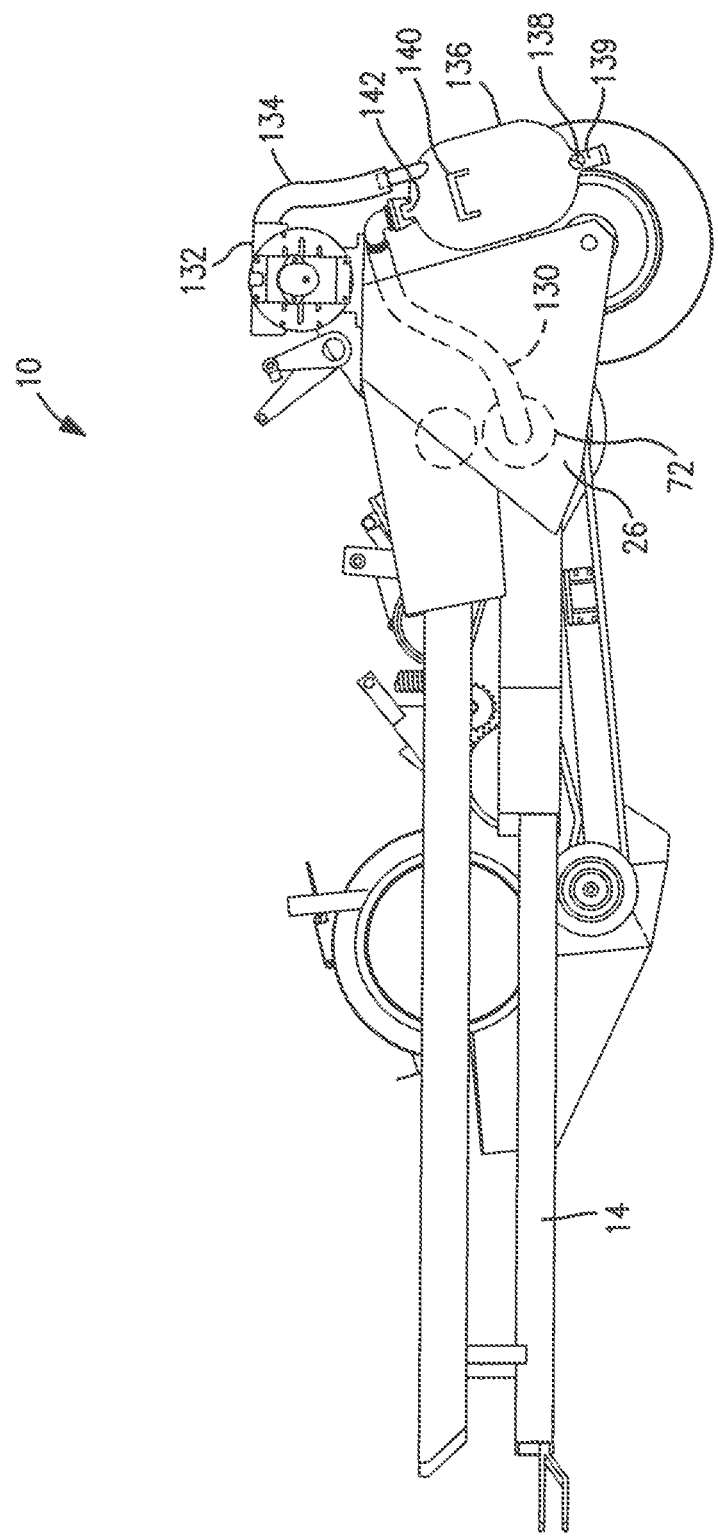
FIG. 12 is a side view of the harvesting machine showing a storage vessel in which the removed liquid is recovered and temporarily stored.

Referring now to FIGS. 7, 8, and 12, the second suction roll 72 includes a stationary member 86 having a central bore 126 which runs along the length of the stationary member 86. The central bore 126 has an opening 128 formed at one end. A first conduit or hose 130 is connected to the opening 128. The first conduit 130 can vary in diameter. The diameter of the first conduit 130 can range from between about 2 inches to about 4 inches. A diameter of about 2 inches works well for the first conduit 130. The first conduit 130 connects the central bore 126 of the stationary member 86 to a storage vessel 136. Moisture, in the form of a liquid, is removed from the cut stems 44 of the plants 42 and is routed through the central bore 126 of the stationary member 86. From here, liquid and air passes through the opening 128 and through the first conduit 130 to the storage vessel 136. The storage vessel 136 removes the liquid from the air. A second conduit 134 connects the storage vessel 136 to a vacuum pump 132. The diameter of the second conduit 134 can range from between about 2 inches to about 4 inches. A diameter of about 2 inches works well for the second conduit 134.

Referring to FIG. 12, the vacuum pump 132 is located downstream of the storage vessel 136 via the second conduit 134. The vacuum pump 132 is designed to pull a negative pressure value. The vacuum pump 132 can be selected to pull a required amount of vacuum. One skilled in the art can determine the amount of vacuum which the vacuum pump 132 needs to pull depending on the size of the harvesting machine 10. It has been determined that the size of the vacuum pump 132 can vary, as well as the flow rate and the horsepower (HP) required to operate the vacuum pump 132. The horsepower can be as high as 300 HP depending on the size of the harvesting machine 10. The flow rating for the vacuum pump 132 can be as high as 3,000 cubic feet per minute (cfm) at 12-14 inches of mercury (Hg) for a harvesting machine 10 designed to have a harvest swath of about 15 feet.

The storage vessel 136 can vary in size, shape and configuration. The storage vessel 136 can be formed from various materials, including but not limited to: fiberglass, plastic, thermoplastics, glass, metal, tin, a composite material, or any other material known to those skilled in the art. A desired material is plastic. The storage vessel 136 can hold varying quantities of liquid. One or more storage vessels 136 can be secured to the harvesting machine 10. The storage vessel 136 can be secured to the frame 26. The storage vessel 136 could be removable, if desired. Desirably, the storage vessel 136 is permanently secured to the frame 26.

The storage vessel 136 can vary in the amount of liquid it can hold. The storage vessel 136 could be sized to hold from between about 1 gallon to about 100 gallons of liquid. Desirably, the storage vessel 136 can hold at least about 5 gallons. More desirably, the storage vessel 136 can hold at least about 10 gallons. Even more desirably, the storage vessel 136 can hold at least about 15 gallons. Most desirably, the storage vessel 136 can hold from between about 5 gallons to about 50 gallons. The storage vessel 136 is equipped with a drain valve 138 and a drain pump 139. The drain valve 138 can be any kind or type of drain valve known to those skilled in the art. A fluid level sensor (not shown) can be positioned in the storage vessel 136. The fluid level sensor can be set to a predetermined level, and when the fluid in the storage vessel 136 reaches this level, the fluid level sensor will trigger the drain valve 138 to open. When this occurs, the drain pump 139 will pump the fluid out of the storage vessel 136. Desirably, the drain valve 138 and the drain pump 139 are located at or near the bottom of the storage vessel 136.

The storage vessel 136 can be securely affixed to the frame 26 by a mechanical fastener. Alternatively, the storage vessel 136 can have a unique shape which permits it to be snugly fitted into a receiving area formed on the frame 26. The storage vessel 136 can contain a handle 140, if desired.

It should be understood that the storage vessel 136 is designed to temporarily retain the liquid removed from the stems 44 of the plants 42 while the harvesting machine 10 traverses a field. Since the liquid has a nutritional value, it can be later processed to form a liquid supplement which can then be fed to live stock or humans. Alternatively, the liquid can be mixed with other feed and be fed to animals, such as milking cows. Another option is to return the liquid to the field where it would serve as a fertilizer.

Figure 13:
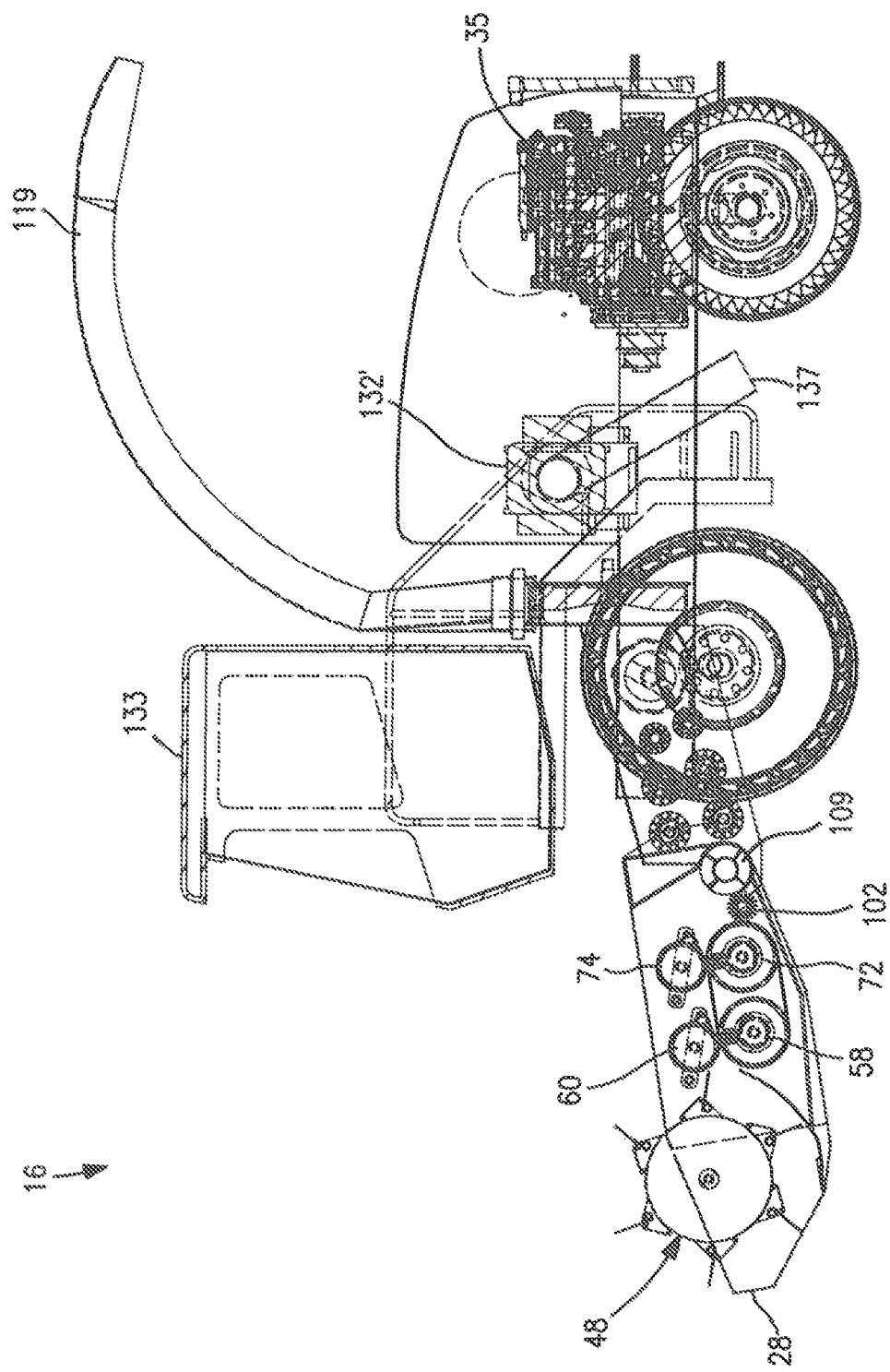
FIG. 13 is a section view of a self-propelled tractor showing a vacuum pump which is capable of depositing removed plant moisture directly onto the ground.

Referring now to FIG. 13, an alternative arrangement is shown using a vacuum pump 132' which is capable of handling a liquid, instead of air, and can deposit the removed plant moisture directly onto the ground. No storage vessel 136 is needed when utilizing the vacuum pump 132'. The vacuum pump 132' is mounted behind a tractor cab 133 and close to an engine 135 so that it can easily be driven by the engine 135. An outlet conduit 137 is connected to the vacuum pump 132 and extends downward toward the ground. The outlet conduit 137 can be angled downward and/or backward away from the tractor cab 133, if desired. The diameter of the outlet conduit 137 can vary. The outlet conduit 137 can have a diameter ranging from between about 2 inches to about 12 inches. The outlet conduit 137 is capable of depositing the removed moisture from the plants 42 directly onto the ground so that the liquid can serve as fertilizer for future crops.

The alternative vacuum pump 132' can be a positive displacement vane or lobe style pump. The alternative vacuum pump 132' can also be a centrifugal type pump.

Figure 14:
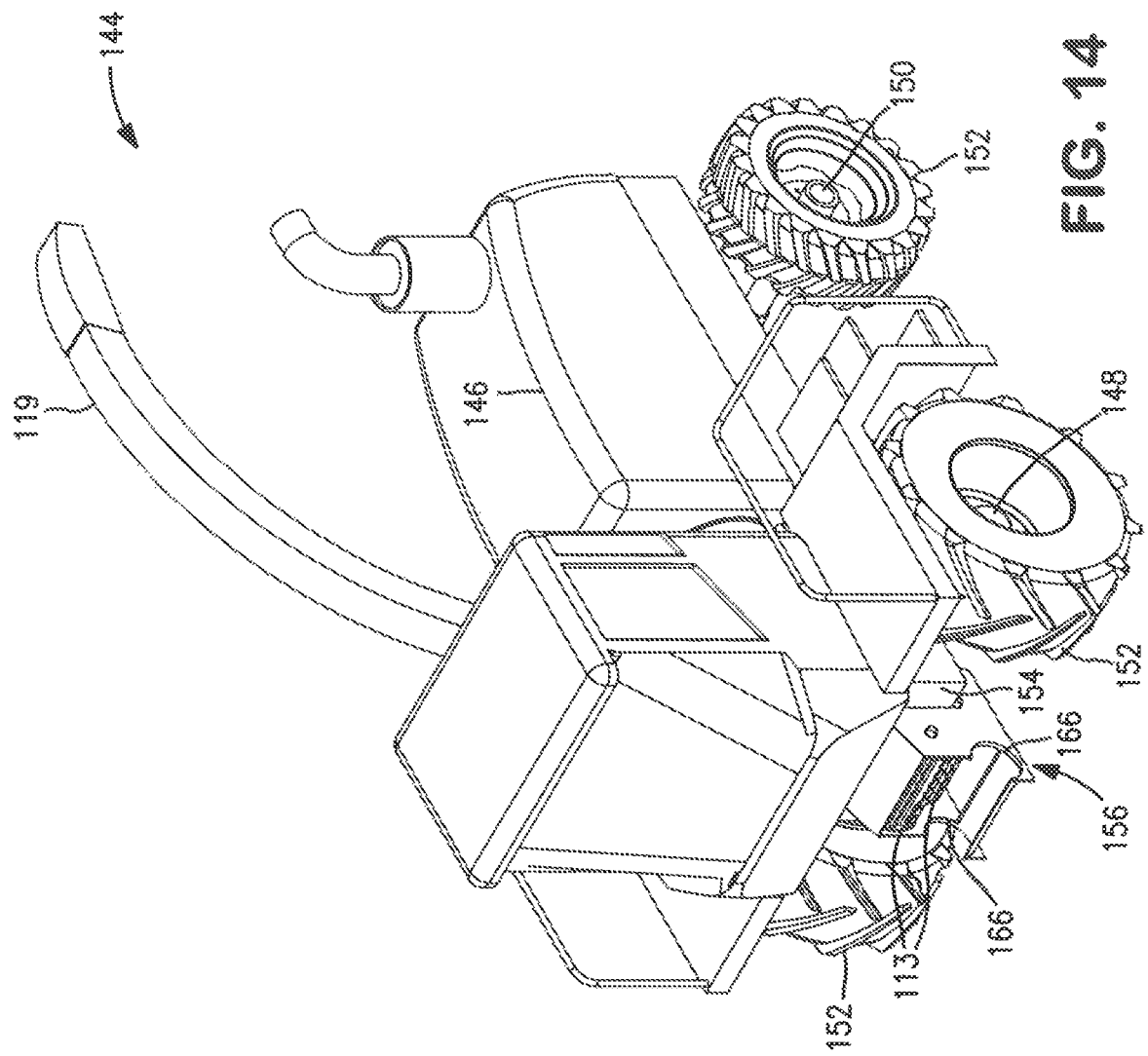
FIG. 14 is a perspective view of a self-propelled unit.

Referring to FIG. 14, a self-propelled unit 144 is shown. By "self-propelled" it is meant containing its own means of propulsion. The self-propelled unit 144 will have its own power source 146, such as an engine, and normally will have two spaced apart axles 148 and 150. Each axle 148 and 150 supports a pair of wheels 152. The self-propelled unit 144 has a front end 154 which contains an attachment mechanism 156. The attachment mechanism 156 can vary in size, shape and design. The attachment mechanism 156 can be a pivot type joint or some other type of device known to those skilled in the art. The self-propelled unit 144 should also include a lift device (not shown) for allowing the attachment mechanism 156 to raise or lower a header 158, see FIG. 15, which can be removably attached to it.

Located rearward or behind the attachment mechanism 156 is a first pair of feed rolls 113, 113. All the mechanisms shown in FIG. 11, to the right of the first pair of feed rolls 113, 113 would be contained in the self-propelled unit 144. This includes structure identical to or similar to the conveyor chute 112, the second pair of feed rolls 114, 114 (if needed), the chopper 115, etc. which can accomplish the same function as the conveyor chute 112 and the blower 118.

Figure 15:
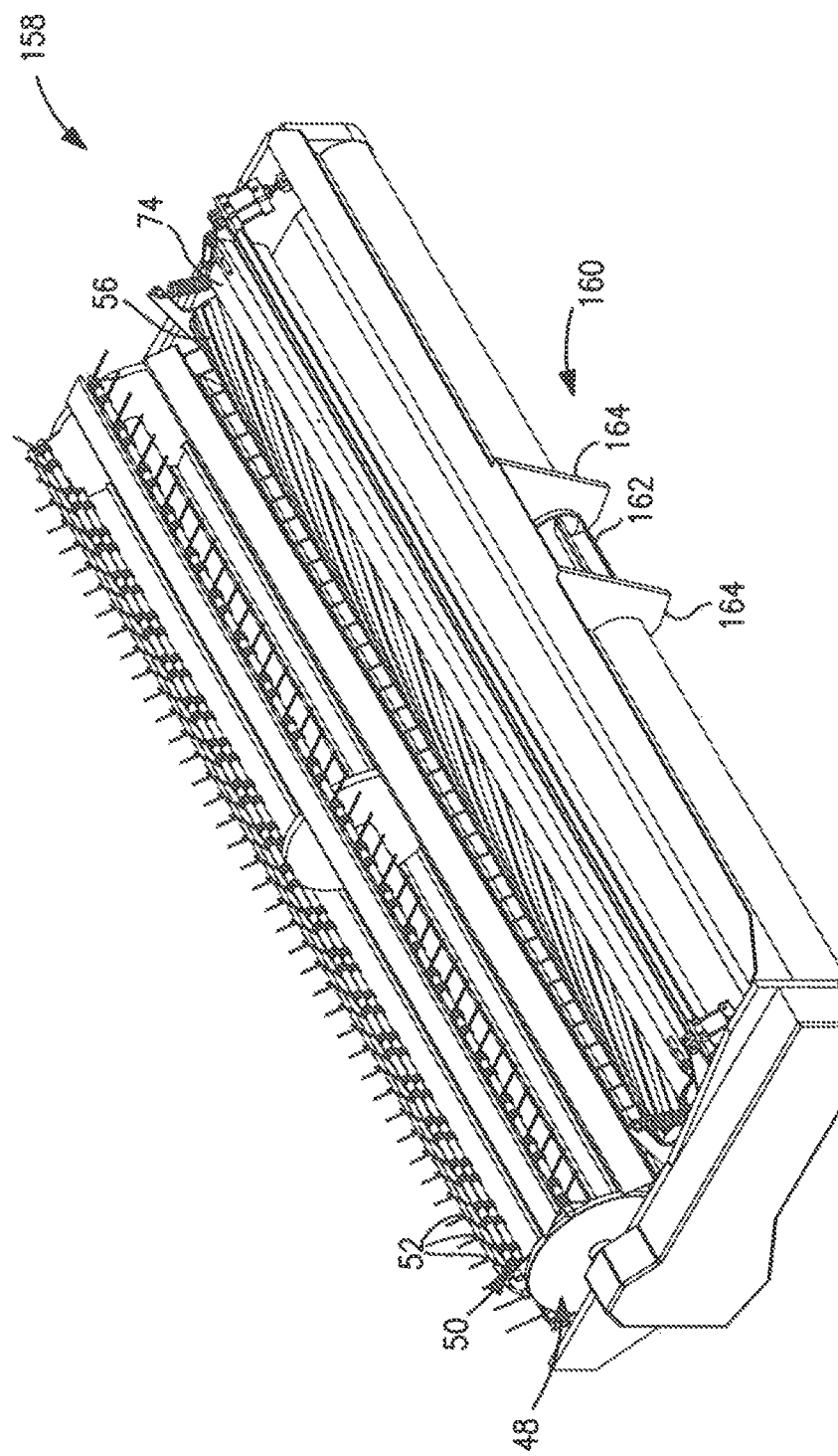
FIG. 15 is a perspective view of a header for harvesting a forage crop which can be attached to a self-propelled machine or be attached to an existing chopper type machine.

Referring now to FIG. 15, the header 158 is shown having a connector 160. The connector 160 is sized, shaped and configured to mate with and/or engage with the attachment mechanism 156. Various types of connectors 160, known to those skilled in the art, can be utilized. In the example shown, the connector 160 includes a cylindrical tube 162 which is horizontally aligned. The cylindrical tube 162 is positioned between a pair of side support plates 164, 164. The pair of side support plates 164, 164 are designed to be positioned adjacent to the opposite sides of the attachment mechanism 156, see FIG. 13. The cylindrical tube 162 is sized to mate with a C-shaped channel or structure 166 formed in the attachment mechanism 156, see FIG. 14. It should be understood that the attachment mechanism 156 and the connector 160 can be of various designs.

The header 158 is removable from the attachment mechanism 156. This means that the header 158 can be removed from the attachment mechanism 156 and stored separately when not needed.

The attachment mechanism 156 should be capable of raising and lowering the header 158, when desired. The elevation of the header 158, relative to the ground, can be adjusted for cutting plants 42 at different heights. The attachment mechanism 156 should also be capable of raising the header 158 off the ground, from between about 6 inches to about 36 inches, so that the header 158 can be transported on a paved roadway.

The header 158 includes all the mechanism shown in FIG. 3 from the pick-up head 48 to the pair of augers 110, 110. All the mechanism after the pair of augers 110, 110 would be contained in the self-propelled unit 144. The self-propelled unit 144 could also include the spout 119 for directing the chopped crop into a storage wagon 120.

The header 158 includes the pick-up head 48, the cutting mechanism 54, and the moving web 68, the first moisture removal mechanism 56, the second moisture removal mechanism 70, and all the mechanical elements and rolls described above with reference to FIGS. 3, 4, 5 and 7-11, up to and including the pair of augers 110, 110.

Figure 16:
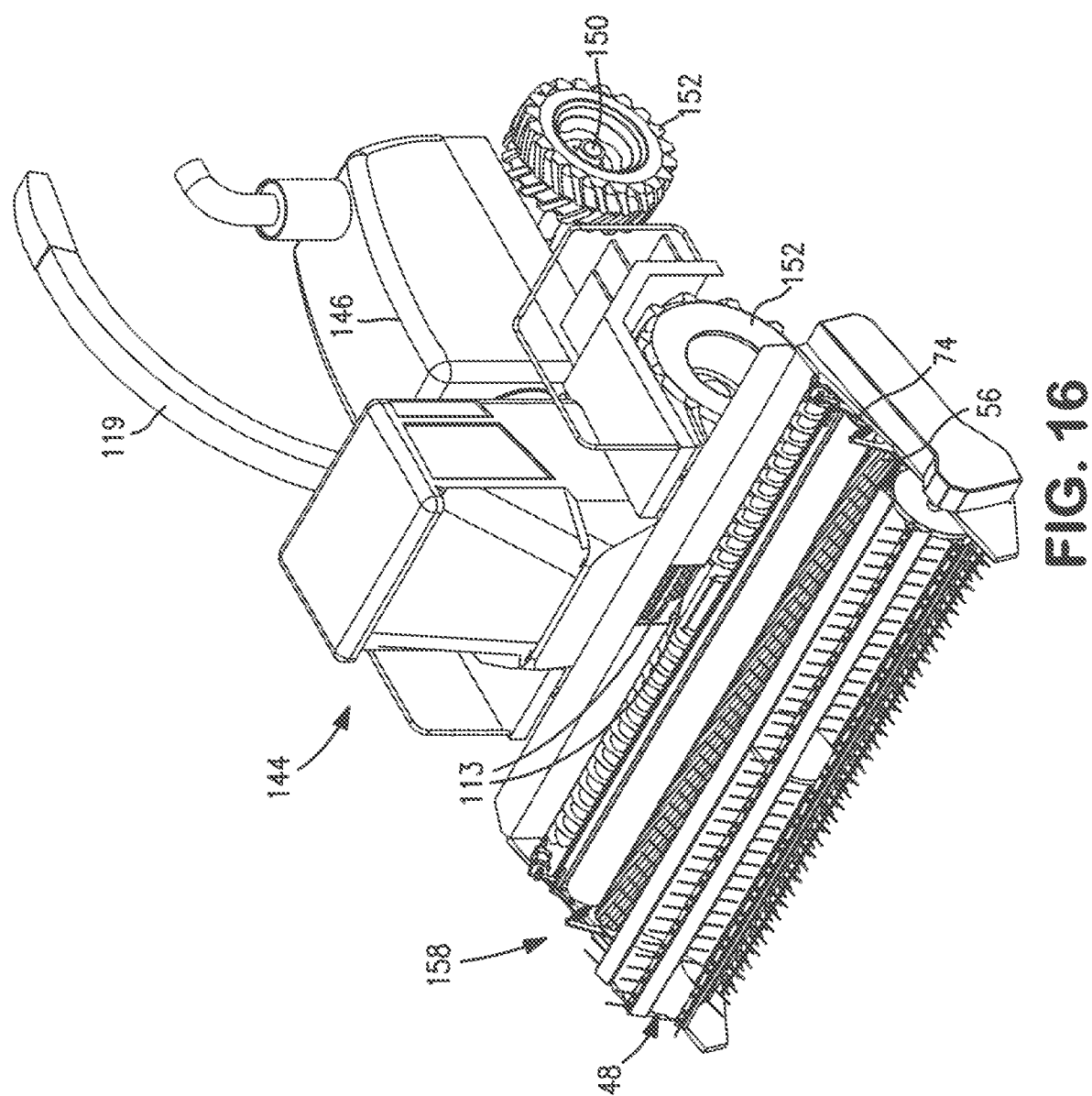
FIG. 16 is a perspective view of a self-propelled harvesting machine with an attached header as is shown in FIG. 15.

Referring to FIG. 16, a self-propelled harvesting machine 144 is shown having a header 158 attached to the front thereof.

It should be understood that the header 158 could also be attached to an existing chopper type machine, which is either self-propelled or a pull-type unit.

Figure 17:
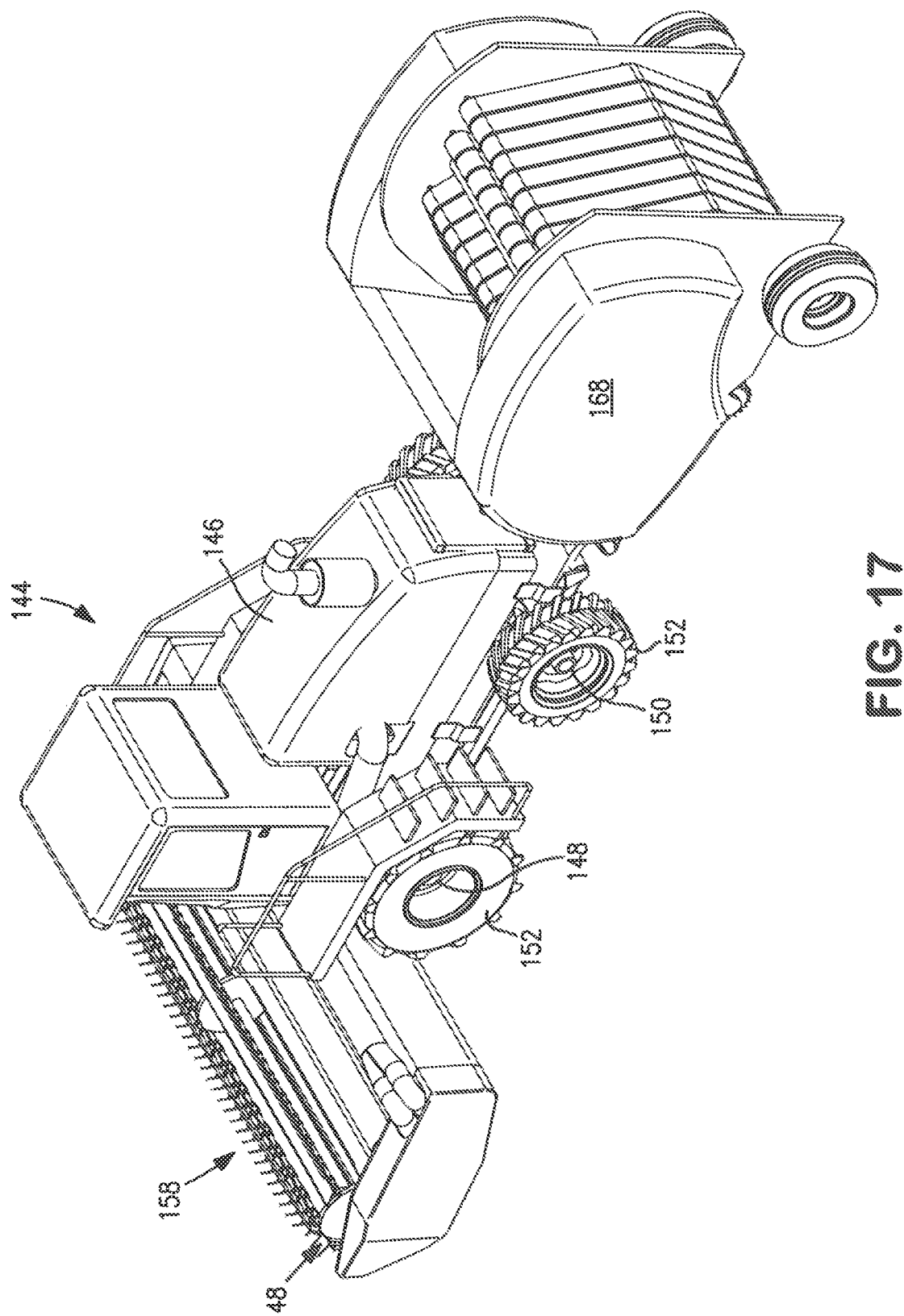
FIG. 17 is a perspective view of a self-propelled harvesting machine which is towing a separate baler unit.

Referring now to FIG. 17, a self-propelled harvesting machine 144 is shown having a header 158 attached to the front thereof and which is towing a baler 168. The baler 168 is a separated unit. The baler 168 can form round bales or rectangular bales, depending on its construction. Today, various makes and models of balers 168 are manufactured by a number of farm implement companies. The bales can be individually wrapped in plastic or be inserted into a hollow tube of plastic to prevent them for rotting. Alternatively, the bales could be transported to a barn or shed for storage.

Figure 18:
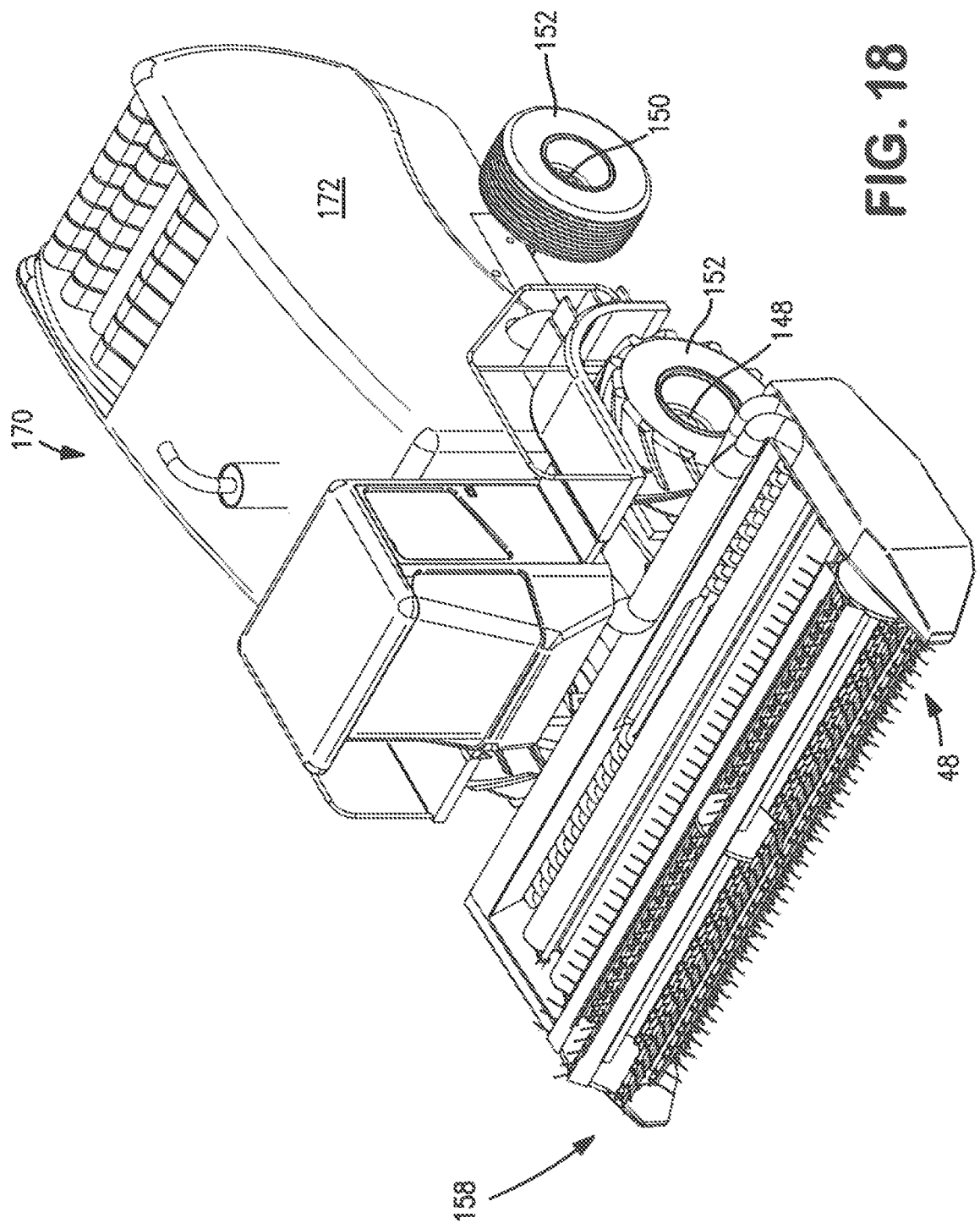
FIG. 18 is a perspective view of a self-propelled harvesting machine which includes an integral baler unit.

Referring now to FIG. 18, an alternative self-propelled harvesting machine 170 is shown which includes an integral baler unit 172. The self-propelled harvesting machine 170 includes a header 158 attached to the front thereof. The self-propelled unit 170 integrally incorporates the baler unit 172. In other words, the baler unit 172 is not a separate implement supported by an axle and a pair of wheels, as is shown in FIG. 17.

Referring to FIGS. 19-24, still another embodiment of a self-propelled harvesting machine 16' is shown which utilizes a flail cutter 174. The self-propelled harvesting machine 16' has a power source 18', such as an engine, and a pair of axles 20 and 22, each of which supports a pair of wheels 24, 24. The self-propelled harvesting machine 16' includes a frame 26 with a first end 28 and a second end 30. A flail cutter 174 is mounted on the first end 28 of the frame 26. The flail cutter 174 has a rotatable shaft 176 with a plurality of cutting blades 178 attached thereto. The flail cutter 174 rotates in a clockwise direction and the plurality of cutting blades 178 cuts the stem base 46 of each plant 42 and also cuts the stem 44 of each plant 42 lengthwise. By cutting the stem 44 lengthwise, one opens up the stem 44 and allows the moisture in the stem 44 to escape. The article entitled: "FLAIL CONDITIONING of ALFALFA HAY", written by Glenn E. Hall and published May, 1962 by the Ohio Agricultural Experiment Station, Wooster, Ohio (Research Circular 107) is incorporated by reference and made a part hereof. This article mentions on page 3, left hand column, that: "The distance through which the moisture must diffuse is reduced by conditioning the forage stem in such a way as to split the stem longitudinally. Thus, more of the stem volume is exposed to the drying medium as well as reducing the distance the moisture must travel, the time required for drying is also reduced".

The cut plants 42 and the split stems 44 are then lifted upward and directed rearward. Several variations of flail cutters 174 are known to those skilled in the art. U.S. Pat. Nos. 4,241,568; 4,631,910; 5,485,718 and 5,666,794 teach different kinds of flail cutters. These U.S. Patents are incorporated by reference and made a part hereof. Generally, a flail cutter 174 utilizes uniquely shaped blades 178, 178; and 178", such as l, y or t shaped blades, which are freely attached to a rotating shaft 176 such that they can flail around. The shaft 176 is powered to rotate parallel to the ground. The plurality of cutting blades 178, 178' or 178" will flail around and shred grass, plants and other kinds of biomass material. The ability of the flail cutter 174 to split the stems 44 of each plant 42 longitudinally is important to reducing the drying time of the harvested plants 42.

Figure 20:
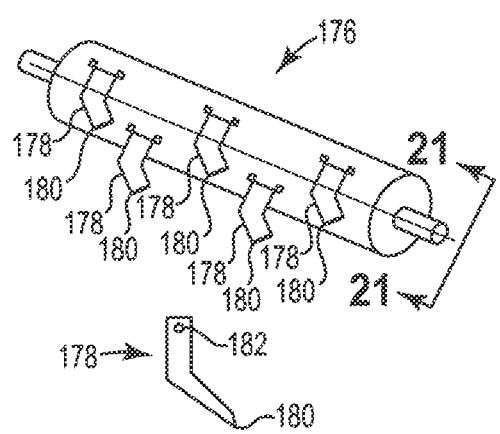
FIG. 20 is a perspective view of a rotatable flail cutter shaft having a plurality of cutting blades mounted to its circumference.
Figure 21:
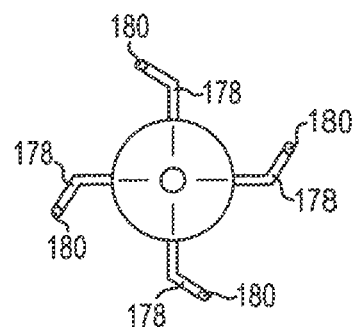
FIG. 21 is an end view of the flail cutter shaft shown in FIG. 20 taken along line 21-21 and showing a cutting blade offset from another cutter blade by 180 degrees.

Referring to FIGS. 20-22, the flail cutter 174 includes an axial shaft 176 which is powered to rotate. The speed of the rotatable shaft 176 can vary. The speed of the rotatable shaft 176 can range from between about 500 revolutions per minute (rpm) to about 1,550 rpm. Desirably, the speed of the rotatable shaft 176 can range from between about 550 rpm to about 1,500 rpm. More desirably, the speed of the rotatable shaft 176 can range from about 750 rpm to about 1,500 rpm. Even more desirably, the speed of the rotatable shaft is at least about 600 rpm. Most desirably, the speed of the rotatable shaft 176 is greater than about 1,000 rpm.

The rotatable shaft 176 has a plurality of spaced apart cutting blades 178 secured along its circumference and about its periphery. The plurality of cutting blades can be positioned and attached along at least a portion of the length of the rotatable shaft 176, along a major portion of the rotatable shaft 176, or along the entire length of the rotatable shaft 176. The length and diameter of the rotatable shaft 176 can vary. The length of the rotatable shaft 176 can range from between about 3 feet to about 20 feet. A length of 3, 4, 5, 6, 7, 8, 9, 10, 11, 12 feet or more, could be utilized. A length greater than 12 feet could also be used, if desired. The diameter of the rotatable shaft 176 can range from between about 3 inches to about 12 inches. A diameter greater than 12 inches could be utilized, if desired.

The number of cutting blades 178 can vary. The flail cutter 174 can have any number of cutting blades 178 positioned, mounted, attached or secured along the length of the rotatable shaft 176. Normally, a cutting blade 178 is positioned at least about 1 inch apart from an adjacent cutting blade 178. Each cutting blade 178 can be offset from an adjacent cutting blade 178 along the length of the rotatable shaft 176. The number of cutting blades 178 will vary depending on the overall length of the rotatable shaft 176 and the attachment pattern utilized. A flail cutter 174 can includes at least about 20, 30, 40, 50, 60, 70, 80, 90, 100, or more, separate and distinct cutting blades 178. More desirably, the flail cutter 174 includes from about 20 to about 400 separate and distinct cutting blades 178. Even more desirably, the flail cutter 174 includes from between about 40 to about 300 separate and distinct cutting blades 178. Most desirably, the flail cutter 174 includes from between about 60 to about 200 cutting blades 178.

The cutting blades 178 can be arranged in various patterns along the length and about the periphery of the rotatable shaft 176. For example, the cutting blades 178 can be arranged in an offset pattern, as is shown in FIG. 20. Alternatively, other patterns or arrangements for attaching or securing the cutting blades 178 along the length and about the periphery of the rotatable shaft 176 can be used. Those skilled in the flail cutter art will be aware of several different arrangements that can be utilized.

Referring to FIGS. 20-22, each of the plurality of cutting blades 178 can be formed or constructed from a strong and/or hard material. For example, each of the plurality of cutting blade 178 can be formed from iron, an iron alloy, metal, a metal alloy, carbon steel, steel, stainless steel, or some combination of alloys known to those skilled in the art. Each of the plurality of cutting blades 178 can also be formed from a composite material, a hard plastic, etc. Each of the plurality of cutting blades 178 has an edge 180. The edge 180 of each cutting blade 178 can vary in size, shape and configuration. The edge 180 can be blunt, square, beveled, pointed, be smooth, be serrated, be sharp, etc. Desirably, the edge 180 of each of the plurality of cutting blades 178 is sharp to facilitate cutting the stems 44 of the plants 42 and also cuts the stems 44 lengthwise to allow moisture in the stem 44 to escape more easily. The edge 180 functions to cut and sever the stem 44 of a plant 42 from the stem base 46. The edge 180 also cuts the stem 44 of each plant 42 lengthwise to split open the stems 44. Desirably, each stem 44 is cut adjacent to its stem base 46 and lengthwise so that the moisture in the stem 44 can escape and the cut stems 44 can dry more quickly.

Figure 23:
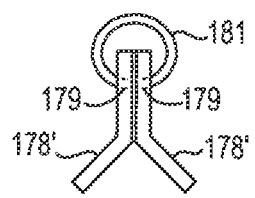
FIG. 23 is a side view of a pair of cutter blades arranged back to back to form a y shape and are attached to a ring which passes through apertures formed in the upper end thereof.
Figure 24:
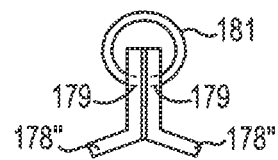
FIG. 24 is a side view of a pair of cutter blades arranged back to back to form a t shape and are attached to a ring which passes through apertures formed in the upper end thereof.

Each of the plurality of cutting blades 178 can be linear or be configured to have a unique profile. An angular profile is shown in FIGS. 21 and 22. Furthermore, a pair of cutting blades 178, 178 can be positioned back to back to form a "y" or a "t" profile as is shown in FIGS. 23 and 24, respectively. In addition, each of the plurality of cutting blades 178 can contain one or more attachment members 182, see FIG. 22, for securing each of the cutting blades 178 along the length and about the periphery of the rotatable shaft 176. Each attachment member 182 can vary in size, shape and configuration. An attachment member 182 can be constructed as: an aperture, as a blind hole, as a through hole, as an abutment, as a pin, as a circular ring, as a U-shaped hanger, as a C-shaped ring, as a shoulder, or by some other means known to those skilled in the art. One or more attachment members can also be used to secure a cutting blade 178 to the rotatable shaft 176. Furthermore, each of the plurality of cutting blades 178 can be attached or secured such that each can pivot, freely flail, thresh or move relative to the surface of the rotatable shaft 176. The ability for each of the plurality of cutting blades 178 to move, flail, thresh or pivot, even to a limited degree, will decrease the likelihood of damage should a cutting blade 178 encounter or rock or some other hard object in a field.

The location of the attachment member 182 on each of the cutting blades 178 can vary. The attachment member 182 can be formed on, in or through a major surface, a side surface or an end surface of a cutting blade 178. For example, the attachment member can consist of an aperture or a hole formed through the cutting blade 178, to which a circular ring is secured. To assist in balancing the rotational shaft 176 as it rotates, it may be desirable to position a cutting blade 178 opposite to another cutting blade 178. In other words, the two cutting blades 178 can be aligned 180 degrees apart from one another, see FIG. 21. Another option is to position three cutting blades 178 at 120 degrees apart from each other about the periphery of the rotatable shaft 176 and to stagger the position of adjacent cutting blades 178, along the length of the rotatable shaft 176, so as to balance the shaft as it rotates.

Referring to FIG. 23, a pair of cutting blades 178', 178' is arranged back to back to form a "y" shape. The pair of cutting blades 178', 178' is not physically joined together but they do abut and touch one another. Each of the pair of cutting blades 178', 178' has an aperture 179 formed through an upper end. A ring 181 passes through the aperture 179 of each cutting blade 178'. This arrangement allows the cutting blades 178', 178' to flail or thresh about. Such action will cut the stems 44 of a plant 42 adjacent to the stem base 46 and also split and/or cut the stems 44 lengthwise which allows the moisture to escape quicker, thus allowing the stems 44 to dry faster.

Referring now to FIG. 24, a pair of cutter blades 178", 178" is arranged back to back to form a 't" shape. The pair of cutting blades 178", 178" is not physically joined together but they do abut and touch one another. Each of the pair of cutting blades 178", 178" has an aperture 179 formed through an upper end. A ring 181 passes through the apertures 179 of each cutting blade 178". This arrangement allows the cutting blades 178", 178" to flail or thresh about. Such action will cut the stems 44 of a plant 42 adjacent to the stem base 46 and also split and/or cut the stems 44 lengthwise which allows the moisture to escape quicker, thus allowing the stems 44 to dry faster.

Returning to FIG. 19, the flail cutter 174 is mounted to the first end of the frame 26 so that the plurality of cutting blades 178 can contact the stems 44 of plants 42 growing in a field. The cutting blades 178 should cut each of the stems 44 adjacent to the stem base 46 of each plant 42. The stem 44 of a plant 42 usually contains a high percent of moisture. The moisture content in a stem 44 is usually greater than the moisture content in the leaves of a plant 42.

The harvesting machine 16' also includes a housing 184 which surrounds at least a portion of the rotatable flail cutter 174. The housing 184 will enclose at least about: 25%, 30%, 35%, 40%, 45%, 50%, 55%, 60%, 65%, 70%, 75% or more of the flail cutter 174. The particular design of the housing 184 will partially determine what percent of the flail cutter 174 is enclosed. The housing 184 functions as a safety shield which protects a person from the flail cutter 174. The housing 184 also functions to direct the cut plants 42 rearward.

An idler roller 186 is positioned rearward from the flail cutter 174. As depicted, the flail cutter 174 has a central axis, designated as 188, and the idler roller 186 has a central axis, designated as 190. The central axis 190 of the idler roller 186 is positioned above and rearward of the central axis 188 of the rotatable flail cutter 174. This position is advantageous in conveying the cut plants 42 rearward from the rotating flail cutter 174. The clockwise rotation of the flail cutter 174 also lift the cut plants 42 and direct them rearward.

The harvesting machine 16' further includes a first moisture removal mechanism 56 positioned downstream of the idler roller 186. The first moisture removal mechanism 56 including a first suction roll 58 positioned below a first press roll 60. A second moisture removal mechanism 70 is positioned downstream of the first moisture removal mechanism 56. The second moisture removal mechanism 70 includes a second suction roll 72 positioned below a second press roll 74. A moving belt 98 forms a closed loop around the idler roller 186 and both the first and second moisture removal mechanisms, 56 and 70 respectively. The moving belt 98 has a plurality of apertures (not shown) formed therethrough. The size, shape and configuration of the apertures formed in the moving belt 98 can vary. The moving belt 98 forms a first nip 62 with the first press roll 60 and a second nip 75 with the second press roll 74 for squeezing moisture out of the stems 44 as the movable web 68 of cut plants 42 is routed through the first and second nips, 62 and 75 respectively. The moving belt 98 moves in a clockwise direction.

The remainder of the harvesting machine 16' is similar to that shown and described earlier relative to FIG. 11. A rotatable brush 102 containing a plurality of outwardly extending bristles 104 is used to clean the moving belt 98. This is followed by a crop converging mechanism 106 which includes an auger housing 109 in which a pair of rotatable augers 110, 110 is housed. The harvesting machine 16' further includes a conveyor chute 112 positioned downstream of the crop converging mechanism 106. The conveyor chute 112 is sized to handle a narrow ribbon 108 of cut stems 44. The conveyor chute 112 houses a first pair of feed rolls 113, 113, an optional pair of feed rolls 113a, 113a (if needed), and a second pair of feed rolls 114, 114 (if needed). The first pair of feed rolls 113 and 113, the optional pair of feed rolls 113a and 113a, and the second pair of feed rolls 114 and 114 functions to route the narrow ribbon 108 of cut plants 42 to a chopper 115. The remainder of the harvesting machine 16' is as was described earlier.

It should also be understood that a self-propelled baler, such as those manufactured by Vermeer Corporation, having an office at 1410 Vermeer Road East, Pella, Iowa, 50219 could also be utilized. In this case, the harvesting machine 144 would deposit a narrow web of cut stems 44 onto the ground, after the moisture content of the cut stems has been reduced. The self-propelled baler would then come along and bale the narrow web of cut stems 44 into either a round bale or into a rectangular bale.

Method

A method of operating a harvesting machine 10 or 16 is also disclosed. Referring to FIGS. 3 and 4, the harvesting machine 10 or 16 has a frame 26 with a first end 28 and a second end 30, at least one axle 32 having a pair of wheels 34, 34. The harvesting machine 10 or 16 also has a bottom plate 36 positioned adjacent to the first end 28. The bottom plate 36 has a front edge 38 and a rear edge 40. The bottom plate 36 is inclined upward towards the rear edge 40. A pick-up head 48 is rotatably mounted on the first end 28 of the frame 26. The pick-up head 48 has at least two spaced apart and outwardly extending finger sets 50, 50. Each finger set 50, 50 contain a plurality of fingers 52 spaced apart from one another across the width of the pick-up head 48. Each finger set 50, 50 sequentially contact the growing plants 42 in a field. Each plant 42 has a stem 44 containing a relatively high moisture content and a base 46. Each of the finger sets 50, 50 will bend the stems 44 downward onto the bottom plate 36 and towards the incline. A cutting mechanism 54 is mounted on the bottom plate 36 below the pick-up head 48. The cutting mechanism 54 cuts each of the stems 44 at the respective base 46 as the harvesting machine 10 or 16 traverses a crop field.

When a harvesting machine 16' is used having a flail cutter 174, the stems 44 of each plant 42 are cut adjacent to the stem base 46 and the stems 44 are also cut and/or split longitudinally. This longitudinal splitting of the stems 44 allow the moisture to escape more quickly.

The harvested crop is directed to a first moisture removal mechanism 56 having a first nip 62 positioned between a first suction roll 58 and a first press roll 60. The cut stems 44 are directed through the first nip 62 wherein a moving web 68 is formed and where from between about 10% to about 20% of the moisture from the stems 44 is removed. The moving web 68 has a width equal to the width of the pick-up head 48. The moving web 68 is then directed through a second nip 75 formed by a second suction roll 72 and a second press roll 74. At the second nip 75, another 5% to about 15% of the moisture from the stems 44 is removed. A third nip (not shown) could further be utilized to remove an additional 1% to about 10% of the moisture from the stems 44, if desired.

The first moisture removal mechanism 56 and the second moisture removal mechanism 70 support a moving belt 98. One or both of the first and second suction rolls, 58 and 72 respectively, can be a drive roll. Desirably, the second moisture removal mechanism 70 is a drive roll. The moving belt 98 forms a closed loop around the first pair of rolls, 58 and 60 and around the second pair of rolls 72 and 74. The moving belt 98 has a plurality of small apertures 100 formed therethrough. The first and second moisture removal mechanisms 56 and 70 function to lower the moisture content in the cut stems 44 by squeezing each of the stems 44 and forcing liquid out of an end of each of the stems 44.

A crop converging mechanism 106 is located downstream of the second moisture removal mechanism 70. The crop converging mechanism 106 reduces the width of the moving web 68 to a narrow ribbon 108 of cut stems 44. The narrow ribbon 108 has a width of about 30 inches or less. Desirably, the narrow ribbon 108 has a width of about 28 inches. More desirably, the narrow ribbon 108 has a width of about 26 inches. Even more desirably, the narrow ribbon 108 has a width of about 24 inches. The crop converging mechanism 106 including a pair of rotating augers 110, 110 aligned on a common shaft 111. One auger 110 can be a right-handed auger and the other auger 110 can be a left-handed auger. The pair of augers 110, 110 can forcibly reduce the width of the moving web 68 by causing a portion of the moving web 68 to move towards the center of the moving web 68. A chopper 115 is positioned downstream of the crop converging mechanism 106 and a blower 118 is positioned downstream of the chopper 115.

The method includes the steps of attaching the harvesting machine 10 to a tractor 12 which can push or pull the harvesting machine 10 back and forth across a crop field for the purpose of harvesting a crop, such as alfalfa. Alternatively, the self propelled harvesting machine 16 can be utilized.

The harvesting machine 10 can be hydraulically, pneumatically, mechanically and/or electrically connected to the tractor 12. The pick-up head 48 will rotate as the harvesting machine 10 is pushed or pulled across the crop field. The cutting mechanism 54 is activated to cut each of the stems 44 at the base 46 as the rotating pick-up head 48 advances through the crop field. The pick-up head 48 moves the cut stems 44 along the bottom plate 36 and into contact with the first nip 62 to form a moving web 68. The moving web 68 is then directed through a second nip 75 to lower the moisture content of the cut stems 44. This is accomplished by squeezing the stems 44 which pushes the liquid from inside each stem 44 through the end opening in each stem 44. This liquid is then sucked into the first and second suction rolls, 58 and 72 respectively, by negative pressure. The moving web 68, with its reduced moisture content, is directed to a crop converging mechanism 106 wherein the width of the moving web 68 is reduced to form a narrow ribbon 108 having a width of about 30 inches or less. The chopper 115 is then used to chop the narrow ribbon 108 into small pieces 117 and a blower 118 is used to blow the small pieces 117 into a storage wagon 120 for transport to a storage facility 122.

The method is beneficial in lowering and reducing the moisture content in the cut stems 44 of plants 42 by at least about 25%. Desirably, the method can lower and reduce the moisture content in the cut stems 44 of plants 42 by at least about 30%. More desirably, the method can lower and reduce the moisture content in the cut stems 44 of plants 42 by at least about 40%. Even more desirably, the method can lower and reduce the moisture content in the cut stems 44 of plants 42 by at least about 45%. Most desirably, the method can lower and reduce the moisture content in the cut stems 44 of plants 42 by at least about 50%. This can be accomplished when the stationary member 82 is operated to pull a negative pressure ranging from between about −5 psi to about −10 psi.

When a harvesting machine 16' is used having a flail cutter 174, the stems 44 of each plant 42 is cut adjacent to the stem base 46 and the stems of each plant 44 are Also cut and/or split longitudinally. The longitudinal cutting or slitting of each stem 44 allows the moisture present in the stem 44 to escape more quickly such that the cut stems 44 will dry quicker. This longitudinal splitting or cutting of each stem 44 will improve drying time and will even lower and reduce the moisture content in the cut stems 44.

The method also includes connecting a central bore 126 of the stationary member 86 to a storage vessel 136 using a first conduit 130. The storage vessel 136 is then connected by a second conduit 134 to a vacuum pump 132. The storage vessel 136 is attached to the frame 26 and is equipped with a drain valve 138 and a drain pump 139. Moisture removed from the cut stems 44, in the form of a liquid, and air are routed from the stationary member 86, through the first conduit 130 to the storage vessel 136. From the storage vessel 136, the air is routed to the vacuum pump 132 while the liquid is collected in the storage vessel 136. The liquid is temporarily retained in the storage vessel 136. The collected liquid can be removed through the drain valve 138 by the drain pump 139. This liquid can be used for various purposes, as was explained above.

The removal of moisture from the stems 44 allow the crop to be harvested and prepared for storage immediately. Crops can be stored in a variety of ways. One method is to chop the high moisture hay, commonly referred to as "hay-lage", and store it in a vertical silo or in horizontal storage bags or in concrete bunkers. A second method is to bale the high moisture crop in the field and then either leave the bales in the field or store them in a building. The bales can be either round or rectangular in shape and are made with baling machines which will produce a particular configuration.

Traditionally, the bales were made with dried hay. Then it was realized that hay having a high moisture content was found to be better feed for animals. This led to individually wrapping and sealing each bale in plastic to preserve its feed value. Now, baling machines are designed to pick-up the cut alfalfa from a windrow placed on the ground. The proposed harvesting machine 10, 16 or 144 of this invention can be designed to provide a windrow of high moisture alfalfa immediately available to be baled. Ideally, this could be accomplished with a single harvesting machine 10, 16 or 144 but from a practical standpoint, it is more feasible that the harvesting machine 10, 16 or 144 will be constructed to cut, remove the moisture from the stems 44 and then lay the harvested crop back on the ground. The crop can then be immediate picked up by a baling machine which is either towed behind the harvesting machine 10, 16 or 144 or which is a separate self-propelled baling machine.

It is also possible that a harvesting machine 10, 16 or 144 could be designed to cut the alfalfa crop, remove the moisture from the stems 44, converge the moving web 68 into a narrow ribbon 108, and then bale the moving web 68 all in single pass over the field.

Figure 19:
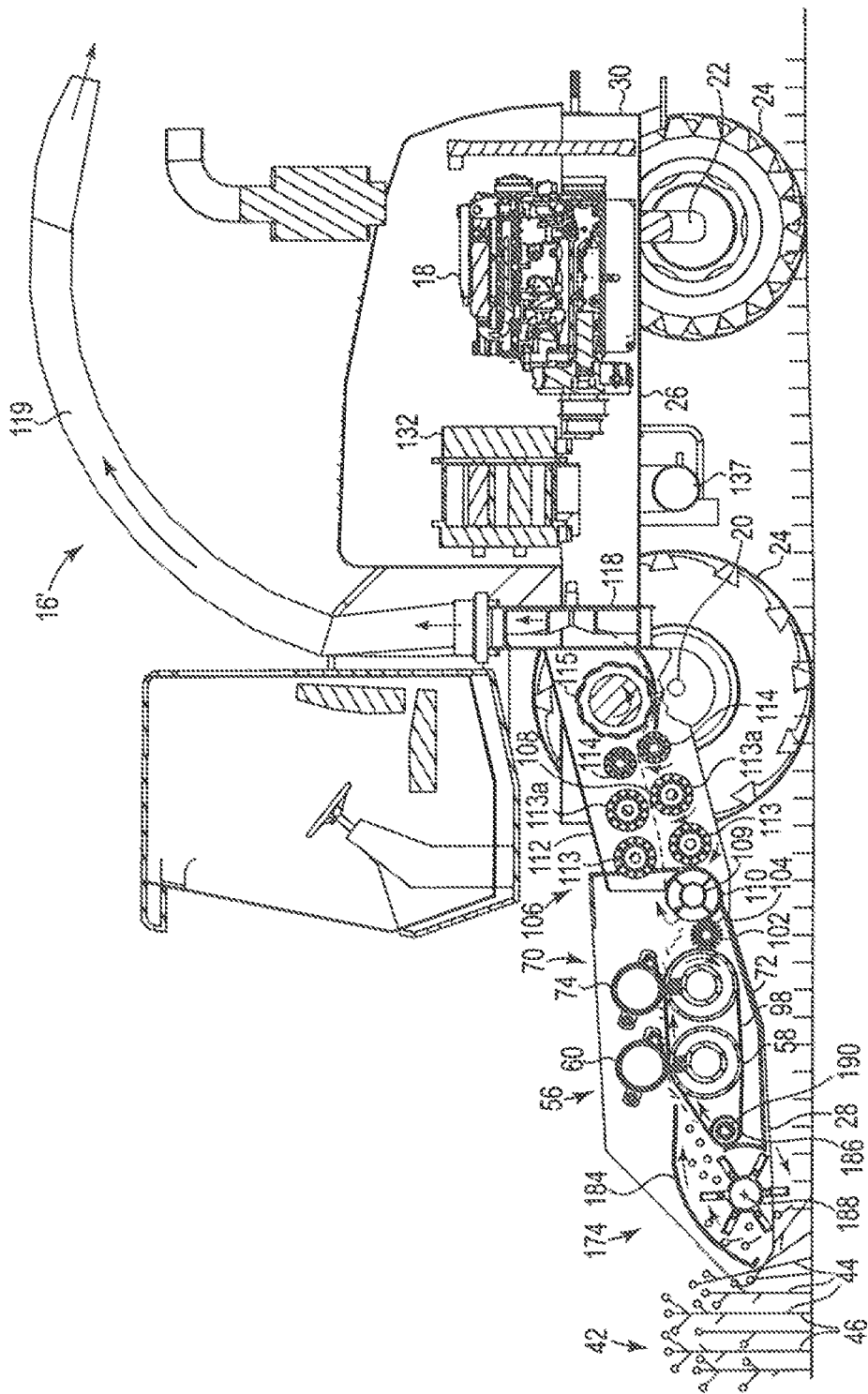
FIG. 19 is a side view of a self-propelled harvesting machine having a rotatable flail cutter.

A method of operating a harvesting machine 16', shown in FIG. 19, will now be explained. The harvesting machine 16' has a frame 26 with a first end 28 and a second end 30. The harvesting machine 16' also includes at least one axle 20 or 22 having a pair of wheels 24. Desirably, two axles 20 and 22 are present. A flail cutter 174 is mounted on the first end 28 of the frame 26. The flail cutter 174 has a rotatable shaft 176 with a plurality of spaced apart, cutting blades 178 attached thereto. Each of the cutting blades 178 contacts growing plants 42 in a field. Each plant 42 has a stem 44 with a high moisture content and a stem base 46. Each of the cutting blades 178 cuts the stems 44 adjacent to the stem base 46 and lengthwise along the stem 44. Once the stem 44 is split or cut open, the cut or split stem 44 can dry more quickly and efficiently. A housing 184 surrounding at least a portion of the flail cutter 174 and directs the cut plants 42 rearward. An idler roller 186 is positioned rearward of the flail cutter 174. A first moisture removal mechanism 56 is positioned downstream of the idler roller 186. The first moisture removal mechanism 56 includes a first suction roll 58 positioned below a first press roll 60. A second moisture removal mechanism 70 is positioned downstream of the first moisture removal mechanism 56. The second moisture removal mechanism 70 includes a second suction roll 72 positioned below a second press roll 74. A moving belt 98 forms a closed loop around the idler roller 186 and both the first and second moisture removal mechanisms, 56 and 70 respectively. The moving belt 98 has a plurality of apertures 100 formed therethrough. The moving belt 98 forms a first nip 62 with the first press roll 60 and a second nip 75 with the second press roll 74 for squeezing moisture out of the stems 44 as the movable web 68 is routed through the first and second nips, 62 and 75 respectively. The method includes the steps of attaching the flail cutter 174 to a self-propelled unit 16' which can be driven across a field for the purpose of harvesting a crop. The shaft 176 of the flail cutter 174 is rotated to cut each of the stems 44, adjacent to the stem base 46, and routing the cut plants 42 into the harvesting machine 16' as a movable web 68. The movable web 68 is then directed between the first and second nips, 62 and 75 respectively, to reduce the moisture content of the movable web 68 by forcing moisture out of each of the plants 42, especially forcing the moisture out of the stems 44.

The rotatable shaft 176 of the flail cutter 174 can be rotated at a speed ranging from between about 500 rpm to about 1,550 rpm. Desirably, the rotatable shaft 176 will rotated at a speed of at least about 600 rpm. More desirably, the rotatable shaft 176 will rotate at a speed ranging from between about 750 rpm to about 1,500 rpm.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A harvesting machine, comprising:
   a) a frame having a first end and a second end, and at least one axle having a pair of wheels;
   b) a flail cutter mounted on said first end of said frame, said flail cutter having a rotatable shaft with a plurality of spaced apart cutting blades attached thereto, each of said cutting blades contacting growing plants in a field, each plant having a stem containing a high moisture content and a stem base, and each of said cutting blades cutting said stems at said stem base as well as lengthwise;
   c) a housing surrounding at least a portion of said flail cutter for directing said cut plants rearward;
   d) an idler roller positioned rearward of said rotatable flail cutter;
   e) a first moisture removal mechanism positioned downstream of said idler roller, and said first moisture removal mechanism including a first suction roll positioned below a first press roll;
   f) a second moisture removal mechanism positioned downstream of said first moisture removal mechanism, and said second moisture removal mechanism including a second suction roll positioned below a second press roll; and
   g) a moving belt forming a closed loop around said idler roller and a portion of both said first and second moisture removal mechanisms, said moving belt having a plurality of apertures formed therethrough, said moving belt forming a first nip with said first press roll and a second nip with said second press roll for squeezing moisture out of said stems as a movable web is routed through said first and second nips.

2. The harvesting machine of claim 1 wherein said plurality of spaced apart cutting blades are positioned about the periphery of said rotatable shaft, and at least one of said cutting blades is offset from an adjacent cutting blade.

3. The harvesting machine of claim 2 wherein said rotatable cutting blades are positioned along at least a portion of the length of said rotatable shaft, and said flail cutter includes at least 20 separate cutting blades.

4. The harvesting machine of claim 3 wherein at least one of said cutting blades is positioned 180 degrees apart from another cutting blade.

5. The harvesting machine of claim 2 wherein said rotatable cutting blades are positioned along a major portion of the length of said rotatable shaft, and said flail cutter includes at least 40 separate cutting blades.

6. The harvesting machine of claim 2 wherein said rotatable cutting blades are positioned along the entire length of said rotatable shaft, and said flail cutter includes at least 100 separate cutting blades.

7. The harvesting machine of claim 1 wherein each of said cutting blades can pivot on said rotatable shaft, and each cutting blade has a sharp edge.

8. The harvesting machine of claim 1 wherein said flail cutter has a central axis and said idler roller has a central axis, and said central axis of said idler roller is positioned above and rearward of said central axis of said rotatable flail cutter.

9. The harvesting machine of claim 1 wherein each of said plurality of cutting blades is formed from a harden material and is attached to said rotatable shaft by a circular ring.

10. The harvesting machine of claim 1, wherein the portion of both said first and second moisture removal mechanisms comprises both said first and second suction rolls.

11. A harvesting machine, comprising:
    a) a frame having a first end and a second end, and at least one axle having a pair of wheels;
    b) a flail cutter mounted on said first end of said frame, said flail cutter having a rotatable shaft with a plurality of spaced apart cutting blades attached thereto, each of said cutting blades contacting growing plants in a field, each plant having a stem containing a high moisture content and a stem base, and each of said cutting blades cutting said stems at said stem base as well as lengthwise;
    c) a housing surrounding at least about 40% of said flail cutter for directing said cut plants rearward;
    d) an idler roller positioned rearward of said flail cutter;
    e) a first moisture removal mechanism positioned downstream of said idler roller, and said first moisture removal mechanism including a first suction roll positioned below a first press roll;
    f) a second moisture removal mechanism positioned downstream of said first moisture removal mechanism, and said second moisture removal mechanism including a second suction roll positioned below a second press roll;
    g) a moving belt forming a closed loop around said idler roller and a portion of both said first and second moisture removal mechanisms, said moving belt having a plurality of small apertures formed therethrough, said moving belt forming a first nip with said first press roll and a second nip with said second press roll for squeezing moisture out of said stems as a movable web is routed through said first and second nips; and
    h) routing said movable web into a baler to form a bale.

12. The harvesting machine of claim 11 wherein said plurality of spaced apart cutting blades are positioned about the periphery of said rotatable shaft, and at least one of said cutting blades is offset from an adjacent cutting blade, and said rotatable shaft is rotated at a speed of from between about 500 rpm to about 1,500 rpm.

13. The harvesting machine of claim 12 wherein at least one of said cutting blades is positioned 180 degrees apart from another cutting blade.

14. The harvesting machine of claim 12 wherein said flail cutter includes at least 80 separate cutting blades.

15. The harvesting machine of claim 11 wherein said plurality of spaced apart cutting blades are positioned along its circumference and about its periphery, and at least one of said cutting blades is offset from an adjacent cutting blade, and said rotatable shaft is rotated at a speed above 600 rpm.

16. The harvesting machine of claim 15 wherein said flail cutter includes at least 100 separate cutting blades.

17. The harvesting machine of claim 11, wherein the portion of both said first and second moisture removal mechanisms comprises both said first and second suction rolls.

18. A method of operating a harvesting machine, said harvesting machine having a frame with a first end and a second end, and at least one axle having a pair of wheels; a rotatable flail cutter mounted on said first end of said frame, said flail cutter having a rotatable shaft with a plurality of spaced apart cutting blades attached thereto, each of said cutting blades contacting growing plants in a field, each plant having a stem containing a high moisture content and a stem base, and each of said cutting blades cutting said stems at said stem base as well as lengthwise; a housing surrounding at least a portion of said rotatable flail cutter for directing said cut plants rearward; an idler roller positioned rearward of said rotatable flail cutter; a first moisture removal mechanism positioned downstream of said idler roller, said first moisture removal mechanism including a first suction roll positioned below a first press roll, a second moisture removal mechanism positioned downstream of said first moisture removal mechanism, said second moisture removal mechanism including a second suction roll positioned below a second press roll, and a moving belt forming a closed loop around said idler roller and a portion of both said first and second moisture removal mechanisms, said moving belt having a plurality of apertures formed therethrough, said moving belt forming a first nip with said first press roll and a second nip with said second press roll for squeezing moisture out of said stems as said stems are routed through said first and second nips, said method comprising the steps of:
- a) attaching said flail cutter to a self-propelled unit which can be driven across the field for the purpose of harvesting a crop;
- b) rotating said flail cutter to cut each of said stems adjacent to said stem base and routing said cut stems into said harvesting machine as a movable web; and
- c) directing said movable web between said first and second nips to reduce the moisture content of said movable web by forcing moisture out of each of said plants.

19. The method of claim 18 further comprising rotating said rotatable shaft of said flail cutter at a speed of from between about 500 rpm to about 1,500 rpm.

20. The method of claim 18 further comprising rotating said rotatable shaft of said flail cutter at a speed of at least about 600 rpm.

21. The method of claim 18 further comprising rotating said rotatable shaft of said flail cutter at a speed of from between about 750 rpm to about 1,500 rpm.

22. The method of claim 18, wherein the portion of both said first and second moisture removal mechanisms comprises both said first and second suction rolls.

23. A header for attachment to a self-propelled unit or to a chopper type machine, which is either self-propelled or a pull-type unit, comprising:
- a) a frame having a first end and a second end;
- b) a flail cutter mounted on said first end of said frame, said flail cutter having a rotatable shaft with a plurality of spaced apart cutting blades attached thereto, each of said cutting blades contacting growing plants in a field, each plant having a stem containing a high moisture content and a stem base, and each of said cutting blades cutting said stems at said stem base as well as lengthwise;
- c) a housing surrounding at least a portion of said flail cutter for directing said cut plants rearward;
- d) an idler roller positioned rearward of said rotatable flail cutter;
- e) a first moisture removal mechanism positioned downstream of said idler roller, and said first moisture removal mechanism including a first suction roll positioned below a first press roll;
- f) a second moisture removal mechanism positioned downstream of said first moisture removal mechanism, and said second moisture removal mechanism including a second suction roll positioned below a second press roll; and
- g) a moving belt forming a closed loop around said idler roller and a portion of both said first and second moisture removal mechanisms, said moving belt having a plurality of apertures formed therethrough, said moving belt forming a first nip with said first press roll and a second nip with said second press roll for squeezing moisture out of said plants as a movable web is routed through said first and second nips.

24. The header of claim 23, wherein the portion of both said first and second moisture removal mechanisms comprises both said first and second suction rolls.

* * * * *